United States Patent [19]
Beals et al.

[11] Patent Number: 6,055,363
[45] Date of Patent: Apr. 25, 2000

[54] MANAGING MULTIPLE VERSIONS OF MULTIPLE SUBSYSTEMS IN A DISTRIBUTED COMPUTING ENVIRONMENT

[75] Inventors: Stephanie A. Beals, Poughkeepsie; Kenneth C. Briskey, Hyde Park; Richard C. Russell, Red Hook, all of N.Y.

[73] Assignee: International Business Machines Corporation, Armonk, N.Y.

[21] Appl. No.: 08/898,450

[22] Filed: Jul. 22, 1997

[51] Int. Cl.[7] .................................................. G06F 9/44
[52] U.S. Cl. ..................... 395/200.31; 395/712
[58] Field of Search ................................ 395/200.31, 712

[56] References Cited

U.S. PATENT DOCUMENTS

| | | | |
|---|---|---|---|
| 5,359,730 | 10/1994 | Marron .................................... | 395/712 |
| 5,367,686 | 11/1994 | Fisher et al. ............................ | 395/712 |
| 5,410,651 | 4/1995 | Sekizawa ............................. | 395/200.31 |
| 5,416,917 | 5/1995 | Adair et al. ............................ | 395/500 |
| 5,421,009 | 5/1995 | Platt ..................................... | 395/200.51 |
| 5,444,851 | 8/1995 | Woest ................................... | 395/200.53 |
| 5,471,617 | 11/1995 | Farrand et al. ......................... | 395/670 |
| 5,550,980 | 8/1996 | Pascucci et al. ....................... | 395/111 |
| 5,555,416 | 9/1996 | Ownes et al. .......................... | 395/712 |

*Primary Examiner*—Krisna Lim
*Attorney, Agent, or Firm*—Floyd A. Gonzalez

[57] ABSTRACT

A parallel distributed computing system having a plurality of processors connected in a network of nodes, each node having software installed thereon, and a control workstation controlling the nodes in the network. A list of the levels of the software installed at each node is stored at the control workstation. A list of software subsystems affected by a command to be executed is stored at the nodes of the network, including the control workstation. In addition, a control script for each of said software subsystems is stored at the nodes, including the control workstation. Each control script provides a routine to be followed for the associated subsystem on the associated node or control workstation during the execution of the command. Since the control scripts are compatible with the level of software installed on the target node, the command will be performed such as to be compatible with the software installed on the target node.

50 Claims, 27 Drawing Sheets

SCENARIO 1: EXAMINE THE SYSPAR_SUBSYSTEMS FILE

| ON CONTROL WORKSTATION, ADMINISTRATOR ISSUES COMMAND: "SYSPAR_CTRL -E". |
|---|

↓

| THE SYSPAR CONTROLLER SCRIPT RECOGNIZES THIS AS AN OPTION THAT IT HANDLES DIRECTLY AND DOES NOT NEED TO CALL THE UNDERLYING SUBSYSTEMS SCRIPTS. |
|---|

↓

| THE SYSPAR CONTROLLER SCRIPT READS IN EACH LINE OF THE SYSPAR_SUBSYSTEMS FILE WHICH IS SHIPPED AS PART OF THE PSSP SOFTWARE. THIS FILE LISTS EACH OF THE PARTITION SENSITIVE SUBSYSTEMS AND THE NAME OF THE CONTROL SCRIPT ASSOCIATED WITH EACH SUBSYSTEM. THE ORDER THAT THE SUBSYSTEMS ARE LISTED IN IS IMPORTANT BECAUSE THIS IS THE ORDER IN WHICH THEY WILL BE ADDED AND STARTED. THE REVERSE ORDER IS HOW THEY WILL BE STOPPED AND DELETED. SO IF SUBSYSTEM B IS DEPENDENT ON SUBSYSTEM A RUNNING, SUBSYSTEM B WILL BE LISTED AFTER A IN THE SYSPAR_SUBSYSTEMS FILE. |
|---|

↓

| THE SYSPAR CONTROLLER EXAMINES EACH SUBSYSTEM CONTROL SCRIPT PAIR AND VERIFIES THAT EACH CONTROL SCRIPT CAN BE FOUND AND EXECUTED OTHERWISE A WARNING MESSAGE IS ISSUED. THIS ALLOWS SUBSYSTEMS TO BE LISTED HERE THAT MAY HAVE OPTIONALLY NOT BEEN INSTALLED WHEN THE PSSP WAS INSTALLED. |
|---|

↓

| SUBSYSTEMS MAY BE LISTED HERE EVEN IF THEY ARE NO LONGER SUPPORTED ON THE LEVEL OF PSSP INSTALLED ON THE CWS OR NODE. THIS IS DONE FOR MIGRATION PURPOSES. FOR EXAMPLE, HB IS NOT ADDED OR STARTED ON PSSP 2.2 NODES. IT STILL IS SUPPORTED AS A PARTITION SENSITIVE SUBSYSTEM BECAUSE IT MUST STILL SUPPORT THE STOP(-K), DELETE (-D) AND CLEAN (-C) OPTIONS FOR MIGRATION PURPOSES. ON A NODE IT WOULD ACCEPT THE ADD(-A) OR START(-S) OPTION BUT WOULD DO NOTHING SINCE HB IS NOT SUPPORTED ON PSSP 2.2 NODES. |
|---|

FIG.6

SCENARIO 2b: NEW INSTALL ON A NODE

---

ON THE CWS, THE ADMINISTRATOR DOES ALL THE PREPARATION WORK TO INSTALL A NEW LEVEL OF AIX AND PSSP ON A NODE.
IF THE AIX AND PSSP VERSION AS DOCUMENTED IN THE SDR IS NOT CORRECT (FOR EXAMPLE THEY WANT TO INSTALL AN EARLIER VERSION OF AIX AND PSSP ON THIS NODE COMPARED TO WHAT IS STORED IN THE SDR) THEN THE NODE'S AIX VERSION AND PSSP VERSION ARE UPDATED IN THE SDR USING THE SPBOOTINS COMMAND.
FOR EXAMPLE, TO INSTALL PSSP-2.2 ON NODE 2 IF THE CWS IS RUNNING PSSP-2.3, INVOKE THE COMMAND:
"SPBOOTINS -P PSSP-2.2 -V AIX421 -I BOS.OBJ.SSP.421
         -R INSTALL -1 2 "

↓

ON THE CWS, THE ADMINISTRATOR PERFORMS SOME OTHER COMMANDS ASSOCIATED WITH INSTALLING THE NODE AND THEN NETWORK BOOTS THE NODE.

↓

AFTER THE NODE GETS INSTALLED WITH THE SPECIFIED LEVEL OF AIX AND PSSP, WHEN THE NODE IS REBOOTED THE SCRIPT RC.SP GETS RUN. THIS SCRIPT STARTS THE PARTITION SENSITIVE SUBSYSTEMS BY
FIRST CALLING THE COMMAND:
"SYSPAR_CTRL -C"
AND THEN THE COMMAND:
"SYSPAR_CTRL -A"

↓

"SYSPAR_CTRL -C": (CLEAN)
THE SYSPAR CONTROLLER INTERPRETS THE -C OPTION AS A NON-MACRO OPTION THAT SHOULD BE PASSED DIRECTLY TO THE UNDERLYING CONTROL SCRIPTS. IN ADDITION, IT RECOGNIZES THE -C (CLEAN) OPTION AS AN OPTION WHERE THE SUBSYSTEMS CONTROL SCRIPTS NEED TO BE CALLED IN REVERSE ORDER OF HOW THEY ARE LISTED IN THE SYSPAR_SUBSYSTEMS FILE. THE SYSPAR CONTROLLER BUILDS A LIST OF VALID SUBSYSTEM CONTROL SCRIPTS PAIRS, AND THEN INVERTS THIS LIST. THE LIST IS THEN READ AND EACH SUBSYSTEM'S CONTROL SCRIPT IS CALLED WITH THE -C OPTION.

"<SUBSYSNAME>CTRL -A": (ADD)
EACH OF THE SYSPAR CONTROLLER SUBSYSTEM CONTROL SCRIPTS GET
CALLED WITH THE -A (ADD) OPTION.
1. THE SCRIPT CHECKS TO SEE IF IT IS RUNNING ON THE CWS OR
   A NODE TO DETERMINE IF IT SHOULD DO ANYTHING OR NOT.
2. THE SCRIPT CHECKS TO SEE THE LEVEL OF AIX & PSSP RUNNING
   TO DETERMINE IF IT SHOULD DO ANYTHING OR NOT.
FOR EXAMPLE, THE HB SUBSYSTEM CONTROL SCRIPT IS INVOKED VIA THE
SYSPAR CONTROLLER CALLING "HBCTRL -A".
THE HB SUBSYSTEM DETERMINES THAT IS BEING RUN ON A NODE,
AND AT THIS LEVEL OF SOFTWARE (PSSP 2.2) HB IS NO LONGER
SUPPORTED ON A NODE - SO IT DOES NOT ADD ITSELF.
ANOTHER EXAMPLE, THE HATS SUBSYSTEM CONTROL SCRIPT IS INVOKED
VIA THE SYSPAR CONTROLLER CALLING "HATSCTRL -A".
THE HATS SUBSYSTEM DETERMINES THAT IT IS BEING RUN ON A NODE,
AND AT THIS LEVEL OF SOFTWARE (PSSP 2.2) HATS WILL BE ADDED.

"<SUBSYSNAME>CTRL -S": (START)
EACH OF THE SYSPAR CONTROLLER SUBSYSTEM CONTROL SCRIPTS GET
CALLED WITH THE -S (START) OPTION.
1. THE SCRIPT CHECKS TO SEE IF IT IS RUNNING ON THE CWS OR
   A NODE TO DETERMINE IF IT SHOULD DO ANYTHING OR NOT.
2. THE SCRIPT CHECKS TO SEE THE LEVEL OF AIX & PSSP RUNNING
   TO DETERMINE IF IT SHOULD DO ANYTHING OR NOT.
FOR EXAMPLE, THE HB SUBSYSTEM CONTROL SCRIPT IS INVOKED VIA THE
SYSPAR CONTROLLER CALLING "HBCTRL -S".
THE HB SUBSYSTEM DETERMINES THAT IS BEING RUN ON A NODE,
AND AT THIS LEVEL OF SOFTWARE (PSSP 2.2) HB IS NO LONGER
SUPPORTED ON A NODE - SO IT DOES NOT ATTEMPT TO START ITSELF.
ANOTHER EXAMPLE, THE HATS SUBSYSTEM CONTROL SCRIPT IS INVOKED
VIA THE SYSPAR CONTROLLER CALLING "HATSCTRL -S".
THE HATS SUBSYSTEM DETERMINES THAT IT IS BEING RUN ON A NODE,
AND AT THIS LEVEL OF SOFTWARE (PSSP 2.2) HATS WILL BE STARTED.

THE RC.SP SCRIPT FINISHES EXECUTING AND THE NODE IS READY TO
BE USED AT THE NEW LEVEL OF AIX AND PSSP.

FIG.8c

SCENARIO 3a: SYSTEM PARTITION CHANGE ON THE CWS

ON THE CWS, THE ADMINISTRATOR DETERMINES TO PARTITION OR REPARTITION THEIR SP SYSTEM, AS NEEDED OR WANTED. THIS IS DONE BY ISSUING A SERIES OF COMMANDS. THE LAST COMMAND THAT MUST RUN IS "SPAPPLY_CONFIG". THIS ACTUALLY APPLIES THE PARTITIONING CONFIGURATION THAT THE ADMINISTRATOR SELECTED AND PARTITIONS THE SP SYSTEM.

"SPAPPLY_CONFIG":
DETERMINES WHICH CURRENTLY EXISTING SYSTEM PARTITIONS WILL NEED TO BE CHANGED TO APPLY THE NEW PARTITIONING CONFIGURATION THAT WAS SELECTED. PREEXISTING SYSTEM PARTITIONS MAY STAY THE SAME, NEED TO BE DELETED, SHRINK IN SIZE OR GROW IN SIZE, AND NEW SYSTEM PARTITIONS MAY BE ADDED.
THE ARCHITECTURE OF THE SYSPAR CONTROLLER MAKES THIS TASK SIMPLER TO DO.
1. PREEXISTING SYSTEM PARTITIONS THAT DO NOT HAVE NEW NODES ADDED OR DELETED FROM THEM, DON'T HAVE TO CHANGE.
   AND THE NODES IN THIS SYSTEM PARTITION DO NOT NEED TO BE REBOOTED.
2. ANY EXISTING SYSTEM PARTITION THAT IS NO LONGER NEEDED (IT MIGHT BE GETTING MERGED BACK INTO AN EXISTING PARTITION) MUST BE DELETED BUT BEFORE IT CAN BE DELETED ANY PARTITION SENSITIVE SUBSYSTEM THAT IS ASSOCIATED WITH THIS PARTITION NEEDS TO BE STOPPED AND REMOVED.
3. ANY EXISTING SYSTEM PARTITION THAT SHRINKS OR GROWS IN SIZE NEEDS TO STOP AND DELETE THE PARTITION SENSITIVE SUBSYSTEMS AND THEN RE ADD AND START THEM SO THEY PICK UP THE CHANGE REGARDING WHAT NODES ARE NOW IN THIS SYSTEM PARTITION.
4. NEW SYSTEM PARTITIONS CAN BE CREATED, AND THE PARTITION SENSITIVE SUBSYSTEMS IN EACH OF THESE SYSTEM PARTITIONS ARE ADDED AND STARTED.

THE SPAPPLY_CONFIG COMMAND STOPS AND DELETES THE PARTITION SENSITIVES SUBSYSTEMS VIA THE SYSPAR CONTROLLER IN ANY SYSTEM PARTITION THAT NEEDS TO BE DELETED OR IS CHANGING IN SIZE.
BY ISSUING THE COMMAND:
"SYSPAR_CTRL -D"

"SUBSYSNAME>CTRL -D": (DELETE)
EACH OF THE SYSPAR CONTROLLER SUBSYSTEM CONTROL SCRIPTS GET
CALLED WITH THE -D (DELETE) OPTION.
1. THE SCRIPT CHECKS TO SEE IF IT IS RUNNING ON A NODE OR A CWS.
2. SINCE IT IS ON THE CWS, THE SCRIPT CHECKS TO SEE IF IT
   EXISTS IN THE ACTIVE SYSTEM PARTITION AND IF IT DOES IT
   DELETES ITSELF FROM WHEREVER IT MAY HAVE ADDED ITSELF WHEN
   INVOKED WITH THE -A OPTION.
FOR EXAMPLE, THE HATS SUBSYSTEM CONTROL SCRIPT IS INVOKED VIA
THE SYSPAR CONTROLLER CALLING "HATSCTRL -D".
THE HATS SUBSYSTEM DETERMINES THAT IT IS RUNNING ON THE CWS,
IT THEN NEEDS TO CHECK WHAT IS THE ACTIVE SYSTEM PARTITION AND
REMOVE ALL ENTRIES ASSOCIATED WITH HATS FROM SRC & /ETC/INITTAB
THAT ARE ALSO ASSOCIATED WITH THIS SYSTEM PARTITION.

THE SPAPPLY_CONFIG COMMAND MUST ADD AND START THE PARTITION
SENSITIVES SUBSYSTEMS VIA THE SYSPAR CONTROLLER IN ANY SYSTEM
PARTITION THAT IS NEW, OR CHANGED IN SIZE (NODES WERE ADDED OR
REMOVED FROM IT), BY ISSUING THE COMMAND:
"SYSPAR_CTRL -A"

"SYSPAR_CTRL -A": (ADD AND START)
THE SYSPAR CONTROLLER INTERPRETS THE -A OPTION AS A MACRO
OPTION WHICH MEANS CALL EACH OF THE UNDERLYING SUBSYSTEM'S
SCRIPTS FIRST WITH THE -A (ADD) OPTION AND THEN WITH THE
-S (START) OPTION. A LIST OF VALID SUBSYSTEM CONTROL SCRIPT
PAIRS IS CREATED PRESERVING THE ORDER OF THE SUBSYSTEMS LISTED
IN THE SYSPAR_SUBSYSTEMS FILE. SINCE ORDER IS IMPORTANT IT
CALLS THE SCRIPT ASSOCIATED WITH THE SUBSYSTEM LISTED FIRST IN
THE LIST OF VALID SUBSYSTEM'S CONTROL SCRIPTS, THEN THE SECOND
UNTIL EACH SUBSYSTEM'S CONTROL SCRIPT HAS BEEN CALLED.

SCENARIO 3b: SYSTEM PARTITION CHANGE ON A NODE

---

ON THE CWS, THE ADMINISTRATOR HAVING JUST PARTITIONED OR REPARTITIONED THEIR SYSTEM MUST NOW REBOOT ALL OF THE NODES THAT WERE AFFECTED BY THE SYSTEM PARTITIONING CHANGE.
THE ADMINISTRATOR ISSUES THE COMMAND TO REBOOT EACH OF THE APPROPRIATE NODES:

↓

ON EACH NODE, AFTER IT IS REBOOTED AS THE LAST STEP OF THE AUTOMATIC REBOOT THE SCRIPT RC.SP GETS INVOKED.
THIS SCRIPT DETERMINES IF THE NODES SYSTEM PARTITION HAS CHANGED SINCE IT WAS LAST REBOOTED. IF IT HAS THEN IT AUTOMATICALLY CALLS THE SYSPAR CONTROLLER TO CLEAN THE OLD PARTITION SENSITIVE SUBSYSTEMS AND THEN TO ADD AND START THE PARTITION SENSITIVE SUBSYSTEMS ASSOCIATED WITH THE NEW SYSTEM PARTITION.
SO RC.SP AFTER DETERMINING THERE WAS A PARTITIONING CHANGE ISSUES THE COMMANDS:
"SYSPAR_CTRL -C"
"SYSPAR_CTRL -A"

↓

"SYSPAR_CTRL -C": (CLEAN)
THE SYSPAR CONTROLLER INTERPRETS THE -C OPTION AS A NON-MACRO OPTION THAT SHOULD BE PASSED DIRECTLY TO THE UNDERLYING CONTROL SCRIPTS. IN ADDITION, IT RECOGNIZES THE -C (CLEAN) OPTION AS AN OPTION WHERE THE SUBSYSTEMS CONTROL SCRIPTS NEED TO BE CALLED IN REVERSE ORDER OF HOW THEY ARE LISTED IN THE SYSPAR_SUBSYSTEMS FILE. THE SYSPAR CONTROLLER BUILDS A LIST OF VALID SUBSYSTEM CONTROL SCRIPTS PAIRS, AND THEN INVERTS THIS LIST. THE LIST IS THEN READ AND EACH SUBSYSTEM'S CONTROL SCRIPT IS CALLED WITH THE -C OPTION.

"<SUBSYSNAME>CTRL −C": (CLEAN)
EACH OF THE SYSPAR CONTROLLER SUBSYSTEM CONTROL SCRIPTS GET CALLED WITH THE −C (CLEAN) OPTION.
1. THE SCRIPT CHECKS TO SEE IF IT IS RUNNING ON THE CWS OR A NODE TO DETERMINE IF IT SHOULD DO ANYTHING OR NOT.
2. THE SCRIPT CHECKS TO SEE THE LEVEL OF AIX & PSSP RUNNING TO DETERMINE IF IT SHOULD DO ANYTHING OR NOT.
FOR EXAMPLE, THE HB SUBSYSTEM CONTROL SCRIPT IS INVOKED VIA THE SYSPAR CONTROLLER CALLING "HBCTRL −C".
THE HB SUBSYSTEM DETERMINES THAT IT IS BEING RUN ON A NODE THIS OPTION IS SUPPORTED ON A NODE AT THIS LEVEL OF PSSP IT EXECUTES THE CODE TO STOP AND REMOVE ALL OCCURRENCES OF THIS SUBSYSTEM ON THIS NODE (REGARDLESS OF PARTITION BOUNDARIES).

↓

"SYSPAR_CTRL −A": (ADD AND START)
THE SYSPAR CONTROLLER INTERPRETS THE −A OPTION AS A MACRO OPTION WHICH MEANS CALL EACH OF THE UNDERLYING SUBSYSTEM'S SCRIPTS FIRST WITH THE −A (ADD) OPTION AND THEN WITH THE −S (START) OPTION. A LIST OF VALID SUBSYSTEM CONTROL SCRIPT PAIRS IS CREATED PRESERVING THE ORDER OF THE SUBSYSTEMS LISTED IN THE SYSPAR_SUBSYSTEMS FILE. SINCE ORDER IS IMPORTANT IT CALLS THE SCRIPT ASSOCIATED WITH THE SUBSYSTEM LISTED FIRST IN THE LIST OF VAILD SUBSYSTEM'S CONTROL SCRIPTS, THEN THE SECOND UNTIL EACH SUBSYSTEM'S CONTROL SCRIPT HAS BEEN CALLED.

↓

EACH OF THE SYSPAR CONTROLLER SUBSYSTEM CONTROL SCRIPTS GET CALLED WITH THE −A (ADD) OPTION.
1. THE SCRIPT CHECKS TO SEE IF IT IS RUNNING ON THE CWS OR A NODE TO DETERMINE IF IT SHOULD DO ANYTHING OR NOT.
2. THE SCRIPT CHECKS TO SEE THE LEVEL OF AIX & PSSP RUNNING TO DETERMINE IF IT SHOULD DO ANYTHING OR NOT.
FOR EXAMPLE, THE HB SUBSYSTEM CONTROL SCRIPT IS INVOKED VIA THE SYSPAR CONTROLLER CALLING "HBCTRL −A".
THE HB SUBSYSTEM DETERMINES THAT IT IS BEING RUN ON A NODE, AND AT THIS LEVEL OF SOFTWARE (PSSP 2.2) HB IS NO LONGER SUPPORTED ON A NODE − SO IT DOES NOT ADD ITSELF.
ANOTHER EXAMPLE, THE HATS SUBSYSTEM CONTROL SCRIPT IS INVOKED VIA THE SYSPAR CONTROLLER CALLING "HATSCTRL −A".
THE HATS SUBSYSTEM DETERMINES THAT IT IS BEING RUN ON A PSSP 2.2 NODE, IT IS SUPPORTED HERE, SO IT ADDS ITSELF.

SCENARIO 4a: MIGRATING THE CWS TO LATEST LEVEL OF PSSP

THE ADMINISTRATOR PREPARES THE CONTROL WORKSTATION FOR THE MIGRATION: TAKING BACKUPS OF NODES AND THE CWS, DETERMINING IF THERE WILL BE ENOUGH SPACE, IF THERE IS A NEED TO PARTITION OR REPARTITION THE SYSTEM DUE TO COEXISTENCE LIMITATIONS, ETC. APPROPRIATE REQUIRED PTFs TO THE CWS AND NODES ARE ALSO INSTALLED.

↓

THE ADMINISTRATOR THEN MIGRATES TO THE LATEST AIX LEVEL, AND VERIFIES THAT THE CORRECT LEVEL OF AIX IS NOW INSTALLED.
THE ADMINISTRATOR NOW PREPARES TO MIGRATE THE PSSP BY COPYING APPROPRIATE FILES INTO APPROPRIATE DIRECTORIES.
THE ADMINISTRATOR MUST ALSO STOP ANY SP RELATED DAEMON. FOR PSSP 2.2 OR LATER CWS THEY CAN STOP ALL OF THE PARTITION SENSITIVE SUBSYSTEMS BY ISSUING ONE COMMAND:
"SYSPAR_CTRL -K -G"

↓

"SYSPAR_CTRL -K -G": (STOP/KILL IN EACH SYSTEM PARTITION)
THE SYSPAR CONTROLLER INTERPRETS THE -G OPTION AS A MACRO OPTION WHICH MEANS RUN THE UNDERLYING SUBSYSTEM CTRL SCRIPTS IN EACH SYSTEM PARTITION. THE SYSPAR CONTROLLER BUILDS A LIST OF ALL OF THE SYSTEM PARTITIONS NAMES DEFINED IN THE SDR.
THE UNDERLYING CONTROL SCRIPTS WILL GET CALLED TO BE RUN IN EACH OF THE SYSTEM PARTITIONS.
THE SYSPAR CONTROLLER INTERPRETS THE -K OPTION AS A NON-MACRO OPTION THAT SHOULD BE PASSED DIRECTLY TO THE UNDERLYING CONTROL SCRIPTS. IN ADDITION, IT RECOGNIZES THE -K (KILL) OPTION AS AN OPTION WHERE THE SUBSYSTEMS CONTROL SCRIPTS NEED TO BE CALLED IN REVERSE ORDER OF HOW THEY ARE LISTED IN THE SYSPAR_SUBSYSTEMS FILE. THE SYSPAR CONTROLLER BUILDS A LIST OF VALID SUBSYSTEM CONTROL SCRIPTS PAIRS, AND THEN INVERTS THIS LIST. THE LIST IS THEN READ AND EACH SUBSYSTEM'S CONTROL SCRIPT IS CALLED WITH THE -K OPTION. ANY OF THE PARTITION SENSITIVE SUBSYSTEMS THAT ARE FOUND RUNNING IN EACH OF THE SYSTEM PARTITIONS WILL BE STOPPED (GRACEFULLY KILLED).

SCENARIO 4b: MIGRATING A NODE TO LATEST LEVEL OF PSSP

ON THE CWS, THE ADMINISTRATOR DOES ALL THE PREPARATION WORK TO MIGRATE A NODE TO THE LATEST LEVEL OF AIX AND PSSP.
LET'S ASSUME THE ADMINISTRATOR WANTS TO MIGRATE A NODE FROM AIX 4.1.5 AND PSSP 2.1 TO AIX 4.2.1 AND PSSP 2.2.
THIS NODE HAS ATTRIBUTES IN THE SDR REFLECTING THE LEVEL OF PSSP AND AIX INSTALLED ON THIS NODE (AIX 4.1.5, PSSP-2.1)
PRIOR TO MIGRATING THE NODE THE SYSTEM ADMINISTRATOR NEEDS TO CHANGE THESE VALUES IN THE SDR TO THE VALUE HE WISHES TO MIGRATE TO.
FOR EXAMPLE, TO MIGRATE TO PSSP-2.2, AIX 4.2.1 ON NODE 2, AND THE CWS IS ALREADY RUNNING PSSP-2.2, INVOKE THE COMMAND:
"SPBOOTINS -P PSSP-2.2 -V AIX421 -R MIGRATE -1 2"

ON THE CWS, THE ADMINISTRATOR NOW NEEDS TO TELL THE PARTITION SENSITIVE SUBSYSTEMS THAT ONE OR MORE NODE'S PSSP LEVEL HAS BEEN CHANGED. AS A RESULT PARTITION SENSITIVE SUBSYSTEMS THAT ARE SENSITIVE TO PSSP VERSION CHANGES NEED TO REFRESH THEMSELVES SO THEY CAN SEE WHICH NODES NOW USE OR WILL USE WHICH LEVEL OF PSSP. THE OLD HEARTBEAT MECHANISM (HB) ONLY WORKS WITH PSSP 1.2 OR PSSP 2.1 NODES. SINCE WE ARE ABOUT TO MIGRATE A NODE FROM PSSP 2.1 TO PSSP 2.2, THE OLD HEARTBEAT WILL NO LONGER HAVE TO WORK WITH THIS PARTICULAR NODE.
THE NEW TOPOLOGY SERVICES (HATS HEARTBEAT) WORKS FOR PSSP 2.2 OR GREATER NODES. SO IT NEEDS TO REFRESH ITSELF SINCE NOW THERE IS A PSSP 2.2 NODE THAT IT IS GOING TO NEED TO WORK WITH. TO REFRESH PARTITION SENSITIVE SUBSYSTEMS THAT ARE SENSITIVE TO PSSP LEVEL CHANGES THE ADMINISTRATOR RUNS THE COMMAND:
"SYSPAR_CTRL -R"

"SYSPAR_CTRL -R": (REFRESH)
THE SYSPAR CONTROLLER INTERPRETS THE -R OPTION AS A NON-MACRO OPTION THAT SHOULD BE PASSED DIRECTLY TO THE UNDERLYING CONTROL SCRIPTS. THE SYSPAR CONTROLLER BUILDS A LIST OF VALID SUBSYSTEM CONTROL SCRIPTS PAIRS WHEN READING THE SYSPAR_SUBSYSTEMS FILE PRESERVING THE ORDER IN WHICH THE SUBSYSTEMS ARE LISTED. THE LIST IS THEN READ AND EACH SUBSYSTEM'S CONTROL SCRIPT IS CALLED WITH THE -R OPTION.

"<SUBSYSNAME>CTRL -R": (REFRESH)
EACH OF THE SYSPAR CONTROLLER SUBSYSTEM CONTROL SCRIPTS GET
CALLED WITH THE -R (REFRESH) OPTION.
1. EACH SCRIPT CHECKS TO SEE IF IT IS RUNNING ON THE CWS OR
   A NODE TO DETERMINE IF IT SHOULD DO ANYTHING OR NOT.
   THE -R (REFRESH) OPTION IS ONLY SUPPORTED ON THE CWS IF
   IT WAS RUN ON A NODE IT WOULD ACCEPT THE OPTION BUT RETURN
   AFTER DOING NOTHING.
2. THE SCRIPT CHECKS TO SEE THE LEVEL OF AIX & PSSP RUNNING
   TO DETERMINE IF IT SHOULD DO ANYTHING OR NOT.
FOR EXAMPLE, CURRENTLY ONLY HB AND HATS SUPPORT THE REFRESH
OPTION AND ONLY WHEN IT IS RUN ON THE CWS. ALL OTHER
SUBSYSTEMS CTRL SCRIPTS WHEN CALLED WITH THIS OPTION, SIMPLY
RETURN DOING NOTHING. WHEN THE HB CTRL SCRIPT IS CALLED WITH
THE REFRESH OPTION IT USES THE SPLST_VERSIONS COMMAND TO LIST
WHAT LEVEL OF PSSP IS RUNNING ON EACH NODE. IT DETERMINES
WHICH NODES ARE RUNNING PSSP 1.2 OR PSSP 2.1 (IF ANY) AND THEN
DOES A DSH (DISTRIBUTES THE COMMAND TO BE RUN ON A SPECIFIED
NODE) OR A HB REFRESH COMMAND TO THE APPROPRIATE NODES.
WHEN THE HATS CTRL SCRIPT IS CALLED WITH THE REFRESH
OPTION IT ALSO USES SPLST_VERSIONS COMMAND TO LIST WHAT LEVEL
OF PSSP IS RUNNING ON EACH NODE. IF IT DETERMINES THAT A NEW
NODE IS NOW RUNNING PSSP 2.2 IT ADDS IT TO ITS GROUP OF NODES
THAT IT HAS TO MONITOR AND SENDS OUT MESSAGES TO ALL OF ITS
PEER NODES IN THIS GROUP TO TELL THEM TO PREPARE TO ALSO
COMMUNICATE WITH THIS NEW NODE.

↓

ON THE CWS, THE ADMINISTRATOR CONTINUES RUNNING APPROPRIATE
COMMANDS TO MIGRATE THE NODE TO THE LATEST LEVEL OF PSSP.
AFTER BOTH AIX AND PSSP HAVE BEEN MIGRATED TO THE LATEST LEVEL
ON THE NODE EITHER WHEN THE NODE REBOOTS (RC.SP IS RUN)
OR IF THE NODE DOESN'T NEED TO BE REBOOTED BUT THEN THE
ADMINISTRATOR MUST MANUALLY RUN THE NEXT TWO COMMANDS ON THE
JUST MIGRATED NODE:
1. REMOVE THE OLD PARTITION SENSITIVE SUBSYSTEMS - THE ONES
   ASSOCIATED WITH THE LAST LEVEL OF AIX AND PSSP INSTALLED ON
   THIS NODE, ISSUE THE COMMAND:
   DSH -W <NODE_NUMBER> "/USR/LPP/SSP/BIN/SYSPAR_CTRL -C"
2. ADD AND START THE PARTITION SENSITIVE SUBSYSTEMS ASSOCIATED
   WITH THIS NEW LEVEL OF AIX AND PSSP, ISSUE THE COMMAND:
   DSH -W <NODE_NUMBER> "/USR/LPP/SSP/BIN/SYSPAR_CTRL -A"

SCENARIO 5: RESTORING A PREVIOUSLY ARCHIVED SDR AND PSSP PARTITIONING ENVIRONMENT

---

ON THE CWS, THE ADMINISTRATOR DETERMINES THE NEED TO RESTORE A PREVIOUSLY ARCHIVED LEVEL OF THE SDR POSSIBLY DUE TO THE CURRENT SDR BECOMING CORRUPTED. THE ADMINISTRATOR RUNS THE COMMAND "SPRESTORE_CONFIG <SDR_ARCHIVE_FILE_NAME>"

---

SPRESTORE_CONFIG PERFORMS THREE TASKS:
1. CALLS SDRRESTORE TO RESTORE THE ACTUAL SDR.
2. REMOVES ANY OF THE OLD PARTITIONED SENSITIVE SUBSYSTEMS "SYSPAR_CTRL -C"
   HERE IS WHERE THE CLEAN IS VERY IMPORTANT COMPARED TO THE DELETE. THE CLEAN WORKS ACROSS PARTITION BOUNDARIES. IT IS NOT DEPENDENT ON USING THE PARTITION NAME WHICH IS CRITICAL HERE, SINCE THE OLD SYSTEM PARTITION NAMES MAY NOT BE KNOWN BECAUSE THEY MAY HAVE BEEN CORRUPTED IN THE SDR.
3. ADDS AND STARTS THE NEW PARTITION SENSITIVE SUBSYSTEMS FOR EACH SYSTEM PARTITION THAT IS DEFINED IN THE SDR. "SYSPAR_CTRL -A"

---

"SYSPAR_CTRL -C": (CLEAN)
THE SYSPAR CONTROLLER INTERPRETS THE -C OPTION AS A NON-MACRO OPTION THAT SHOULD BE PASSED DIRECTLY TO THE UNDERLYING CONTROL SCRIPTS. IN ADDITION, IT RECOGNIZES THE -C (CLEAN) OPTION AS AN OPTION WHERE THE SUBSYSTEMS CONTROL SCRIPTS NEED TO BE CALLED IN REVERSE ORDER OF HOW THEY ARE LISTED IN THE SYSPAR_SUBSYSTEMS FILE. THE SYSPAR CONTROLLER BUILDS A LIST OF VALID SUBSYSTEM CONTROL SCRIPTS PAIRS, AND THEN INVERTS THIS LIST. THE LIST IS THEN READ AND EACH SUBSYSTEM'S CONTROL SCRIPT IS CALLED WITH THE -C OPTION. ALL THE PARTITION SENSITIVE SUBSYSTEM REGARDLESS OF PARTITION BOUNDARY OR PARTITION NAME ARE STOPPED AND THEN DELETED. SUBSYSTEMS THAT WERE INACTIVE (NOT RUNNING) WILL SIMPLY BE DELETED.

MANAGING MULTIPLE VERSIONS OF MULTIPLE SUBSYSTEMS IN A DISTRIBUTED COMPUTING ENVIRONMENT

BACKGROUND OF THE INVENTION

The present invention relates to parallel, distributed processing systems, and more particularly relates to managing multiple subsystems being run under multiple levels of operating systems and system support software in a parallel, distributed processing system.

A parallel, distributed computing system, such as the IBM RISC/System 6000 Scalable POWERparallel Systems SP computer, contains multiple host computer systems or nodes, each running the AIX operating system (the IBM version of the UNIX operating system) and the IBM Parallel System Support Programs (PSSP) package of system support software. The nodes are grouped into one or more system partitions, each of which represents a logical domain which portrays a virtual SP environment. Introduced with PSSP version 2.2, each node in a system partition may run any supported level of operating system software (AIX). In addition, each node in the system partition may run any level of support software (PSSP) supported by the level of operating system running on that node.

This ability to run different levels of operating system and support software within the same system partition presents a number of new management problems for the administration of the system. Because different levels of operating system and support software may be running across nodes in the same system partition, it must be determined which level(or in some cases which multiple levels) of that support subsystem to initiate on any given node. Since different levels of subsystems must be managed according to the level of underlying software, it becomes administratively tedious and time-consuming for the administrator if he is required to manually track which level is being started and managed on each node. A uniform mechanism (identical interface) is required to automatically start, stop, refresh, etc. a subsystem running on a node regardless of what level of operating system or support software is running on that node.

U.S. Pat. No. 5,367,686 issued Nov. 22, 1994 to Fisher et al. for METHOD FOR AUTOMATED COMPLEX MULTILEVEL SOFTWARE INSTALLATION IN A DATA PROCESSING SYSTEM discloses a method for automatically installing multi-level software in an unattended fashion by building an installation package on a portable storage media. The package contains the data, instructions and pre-selected configuration information to perform the installation without manual intervention.

U.S. Pat. No. 5,444,851 issued Aug. 22, 1995 to Woest for METHOD OF ACCESSING CONFIGURED NODES IN A FACILITIES MANAGEMENT SYSTEM WITH A NON-CONFIGURED DEVICE discloses automated facilities management systems (FMS) wherein different nodes in a distributed FMS are running at different levels of software and/or need to be updated to different levels of software.

U.S. Pat. No. 5,471,617 issued Nov. 28, 1995 to Farrand et al. for COMPUTER MANAGEMENT SYSTEM AND ASSOCIATED MANAGEMENT INFORMATION BASE discloses a method of managing a plurality of networked manageable devices from a manager console using a management information base.

U.S. Pat. No. 5,550,980 issued Aug. 27, 1996 to Pascucci et al. for NETWORKED FACILITIES MANAGEMENT SYSTEM WITH OPTICAL COUPLING OF LOCAL NETWORK DEVICES discloses a controller which provides a unified approach to manage heterogeneous hardware devices. The disclosed facilities management system can automatically trigger commands to be run by sensing some registered change.

U.S. Pat. No. 5,416,917 issued May 16, 1995 to Adair et al. for HETEROGENOUS DATABASE COMMUNICATION SYSTEM IN WHICH COMMUNICATING SYSTEMS IDENTIFY THEMSELVES AND CONVERT ANY REQUESTS/RESPONSES INTO THEIR OWN DATA FORMAT discloses a method and system for establishing the context in which data exchanged between heterogeneous relational DBMS can be mutually understood and preserved and data conversions minimized. In the disclosed system, descriptive information for each machine in the system is stored into a database.

SUMMARY OF THE INVENTION

The disclosed embodiment involves three parts: recording the software level information, reporting (retrieving) that level information, and uniform management of a subsystem regardless of the operating system, support software or subsystem level. To facilitate overall system management of the individual nodes, the operating system level and support software level are recorded in a central repository for general access throughout the system. This information is placed in the central repository via user-executed commands. In order to effectively manage the system partition which may include nodes running multiple levels of the operating system and support software, a new command called "splst_versions" is provided to analyze the software level information about one or more nodes in the system partition as recorded in the central repository, and report that information to the requester.

This command will optionally list:

the operating system level of one or more nodes, the support software level of one or more nodes, the lowest (earliest) operating system level running within the system partition, the lowest (earliest) support software level running within the system partition, the highest (latest) operating system level running within the system partition, and the highest (latest) support software level running within the system partition.

Support subsystems running within a system partition typically require the running of one or more subsystem daemons on each node to provide services to/from that node to/from the other nodes in the system partition. The software level of the subsystem daemon is usually dictated by a combination of the level of operating system and support software running on the node. On the control node, a subsystem daemon for each different level or subsystem daemon supporting different levels, must be run in order to communicate with the different levels of subsystem daemons running throughout the system partitions.

A new command called the "Syspar Controller" (syspar_ctrl) provides the interface to manage the starting, stopping, refreshing, etc. of subsystem daemons throughout the nodes, including the control node. A file called "syspar_subsystems" is included and is read by the Syspar Controller. The "syspar_subsystems" file contains the list of software subsystem names under control of the Syspar Controller along with the pathname to an associated control script for each subsystem. There is a different syspar_subsystems file for each level of support software. The Syspar Controller is invoked with a function code (option flag) by the administrator or by an administrative function of the support software as necessary. The Syspar Controller invokes the control script for each subsystem under its control (as found in the syspar_subsystems file) passing the function code along for interpretation by each subsystems' control script. The control script for each subsystem is responsible for performing whatever processing is required to implement that function in the subsystem throughout the system. In this way, the administrator is relieved of the responsibility of managing the potentially many and different levels of subsystem daemons with their varying options throughout the collection of nodes which comprise the system partition.

As mentioned, the Syspar Controller completes its tasks by invoking a control script for each subsystem listed in the syspar_subsystems file. This control script is a program which is specific to each different subsystem. (Typically, a control script controls one daemon. However, for some subsystems, it may control more than one.) The control script has intimate knowledge of the interface requirements of its subsystem—how to start it, stop it, refresh it, etc. Every control script (regardless of subsystem daemon) is invoked by the Syspar Controller with the same function code to accomplish the same task (e.g., -s for start, -k for stop, -r for refresh, etc.). The control script turns the generic function code into the specific command invocation required to perform that function on the level of subsystem daemon running on the node or control node. This mechanism relieves the administrator from issuing individual (and potentially different) commands throughout nodes in a system partition when a function is required to be performed on them. The administrator need only ensure that the correct level information has been recorded in the central repository.

It is thus a primary object of the present invention to provide a mechanism which provides a single, uniform interface to manage system functions throughout a system of nodes running mixed levels of software.

It is another object of the present invention to provide a mechanism to manage from a control workstation, system functions on nodes running mixed levels of software of a system having multiple nodes connected in a network of nodes.

It is another object of the present invention to provide a mechanism for displaying the levels of software installed on nodes connected in a network of nodes to assist in the managing of system functions on the nodes.

It is another object of the present invention to provide a mechanism for reporting the changing of the level of software installed on a node in a system of nodes connected in a network, and for allowing for the changing of the level of software on one node without rebooting the software installed on the other nodes.

It is thus another primary object of the present invention to provide a program product for providing a single, uniform interface to manage system functions throughout a system of nodes running mixed levels of software.

It is another object of the present invention to provide a program product to manage from a control workstation, system functions on nodes running mixed levels of software of a system having multiple nodes connected in a network of nodes.

It is another object of the present invention to provide a program product for displaying the levels of software installed on nodes connected in a network of nodes to assist in the managing of system functions on the nodes.

It is another object of the present invention to provide a program product for reporting the changing of the level of software installed on a node in a system of nodes connected in a network, and for allowing for the changing of the level of software on one node without rebooting the software installed on the other nodes.

The foregoing and other objects, features and advantages of the invention will be apparent from the following more particular description of the preferred embodiment of the invention as illustrated in the drawings.

BRIEF DESCRIPTION OF THE DRAWINGS

FIG. 6 is a flowchart for scenario 1 for examining the syspar_subsystems file by the Syspar Controller command;

FIGS. 8a, 8b and 8c, when joined at b—b and c—c, form a flowchart for scenario 2b for performing a new install of an operating system and support software on a node of the system of FIG. 1;

FIGS. 9a, 9b, 9c and 9d, when joined at d—d, e—e and f—f, form a flowchart for scenario 3a for performing a system partition change on the control workstation;

FIGS. 10a, 10b and 10c, when joined at g—g and h—h, form a flowchart for scenario 3b for performing a system partition change on a node;

FIG. 11a, 11b and 11c, joined at i—i and j—j, form a flowchart for scenario 4a for migrating the control workstation to the latest level of the operating system and support software;

FIGS. 12a, 12b, 12c, 12d and 12e, joined at k—k, l—l, m—m and n—n, form a flowchart for scenario 4b for migrating a node to the latest level of the operating system and the support software; and FIGS. 13a and 13b, joined at o—o, form a flowchart for scenario 5 for restoring a previously archived SDR and PSSP partitioning environment.

DESCRIPTION OF THE PREFERRED EMBODIMENT

The present invention is also described in U.S. patent application Ser. No. 08/898,609 filed Jul. 22, 1997 for METHOD FOR MANAGING MULTIPLE VERSIONS OF MULTIPLE SUBSYSTEMS IN A DISTRIBUTED COMPUTING ENVIRONMENT, owned by the assignee of the present invention and incorporated herein by reference.

Figure 1:
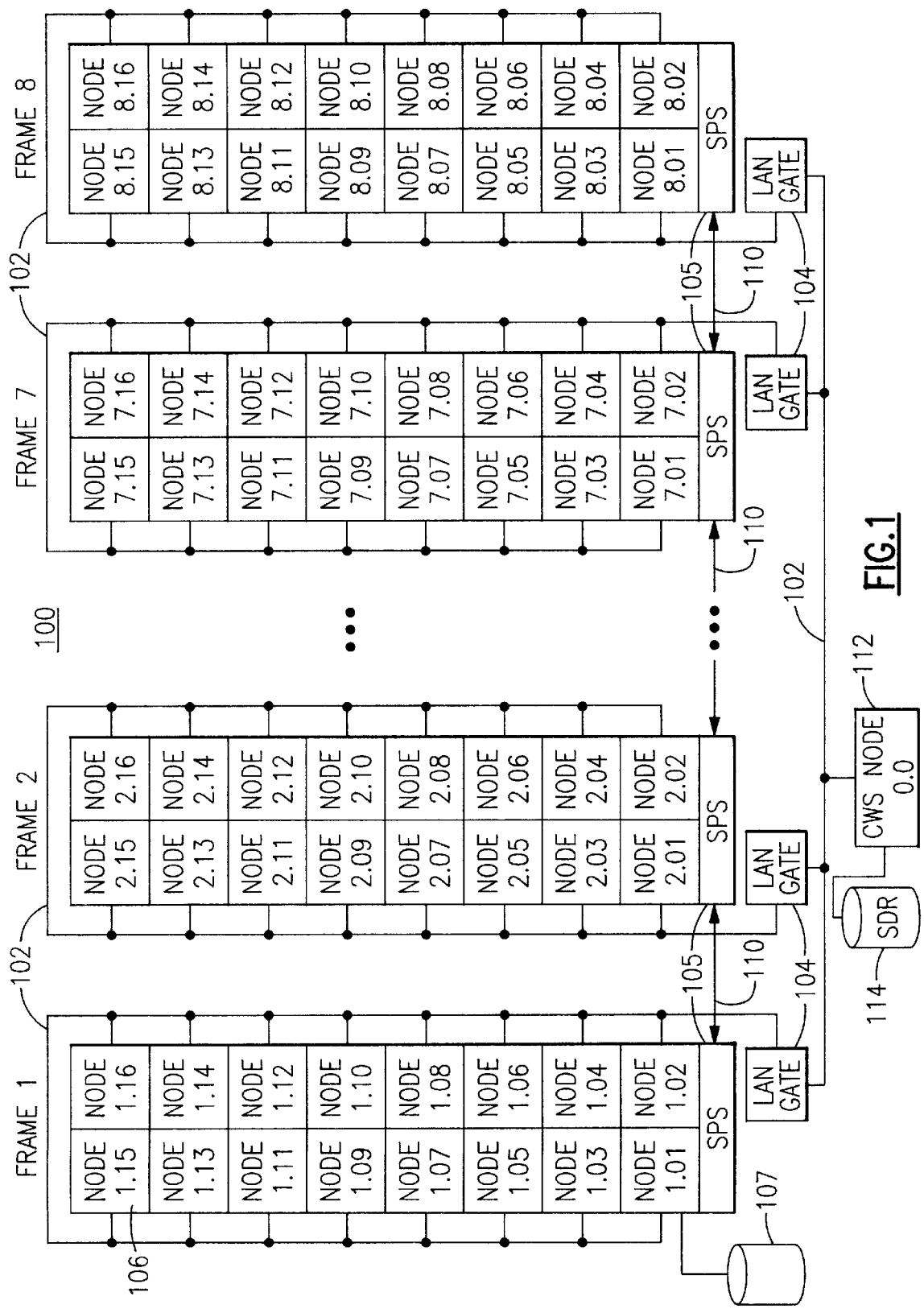
FIG. 1 is a block diagram showing a distributed computing system usable with the present invention, the distributed computing system having a control workstation (CWS), multiple nodes and a direct access storage device having stored thereon system data repository (SDR) files.

FIG. 1 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well known by those skilled in the art. It will be understood that a greater or lesser number of nodes 106 than the number shown in the present embodiment may be used, if desired.

All of the nodes 106 in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 on which is stored, among other files, the system data repository files (SDR). The SDR files include such information as a list of nodes that are in the system and their configuration, and, as will be discussed further, the level of operating system and support software running on each node. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As is well understood in the art, the CWS node 112 may send system data and control signals to the frames of the SP computer 100 by means of the LAN 102 while messages and data may be sent from one to another of the nodes 106 by means of the high performance switches 105.

Figure 2:
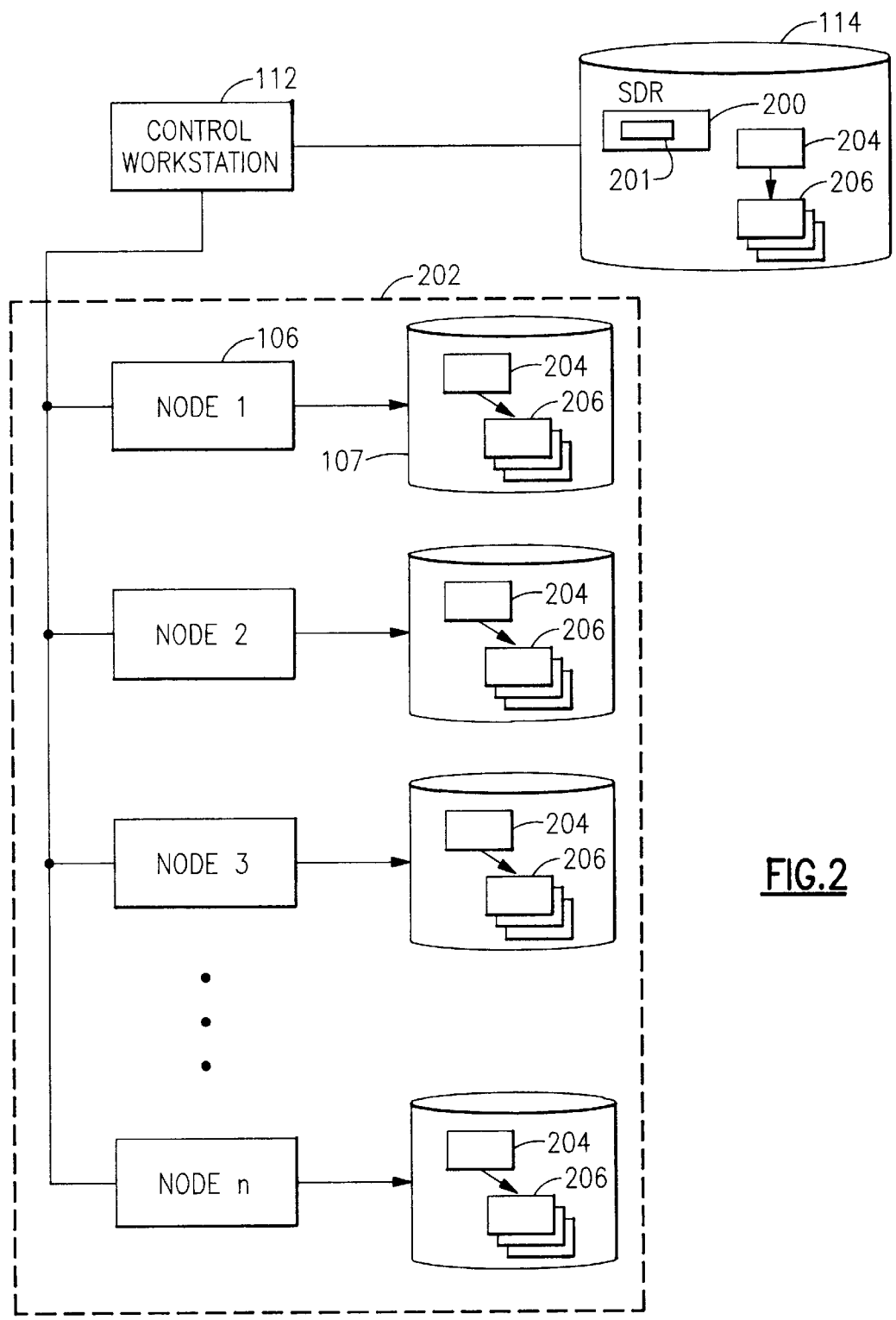
FIG. 2 is a block diagram showing a syspar_subsystems file which lists the subsystems managed by a syspar controller command and control scripts files in the CWS and each node in a partition of nodes of the distributed computing system of FIG. 1.

FIG. 2 is an illustration of a portion of the system of FIG. 1. Shown in FIG. 2, is the control workstation 112 connected to a portion of the nodes 106 in a partition 202 of the SP machine of FIG. 1. Shown in the partition 202, for illustration purposes, are nodes 1, 2, 3, . . . n. The control workstation 112 functions as manager of the distributed computing system and is the interface through which most administrative tasks are performed. The distributed system nodes 106 may run different levels of operating system software (AIX) and support software (PSSP). Software subsystems (such as heam, hags and hats) run on each distributed system and communicate among themselves and the control workstation 112 to provide inter-node services. These software subsystems are well known in the art, and will not be discussed in any further detail. The distributed system 100 runs a set of software subsystems at a level appropriate for the level of operating system and support software running on each node 106. The control workstation 112 may run multiple sets of support subsystems—one for each level represented in the distributed system 100. The System Data Repository (SDR) files 200 which reside on the DASD 114 include a levels data file illustrated at 201. The levels data file 201 includes a listing of the levels of the AIX operating system and PSSP support software being run on each node in the partition 202.

An example of the levels file 201 is shown in Table 1.

TABLE 1

| Node | AIX Level | PSSP Level |
|------|-----------|------------|
| 1 | AIX-414 | PSSP-2.1 |
| 2 | AIX-420 | PSSP-2.2 |
| 3 | AIX-325 | PSSP-1.2 |
| . | . | . |
| . | . | . |
| . | . | . |
| n | AIX-414 | PSSP-2.2 |

As shown in the example of Table 1, node 1 of partition 202 is running AIX-414 and PSSP-2.1, while node 2 is running AIX-420 and PSSP-2.2, node 3 is running AIX-325 and PSSP-1.2, and node n is running AIX-414 and PSSP-2.2.

In the present embodiment, the level data for the operating system and the PSSP support software is written into the levels data file 201 using the "spbootins" command, as described in *IBM Parallel System Support Programs for AIX Command and Technical Reference*, GC23-3900-01, available from IBM and well understood by those in the art.

Typically the AIX and PSSP levels are changed in the levels file 201 on a new install or migration from one level to another, as will be explained. In order to effectively manage the system partition 202 which may include nodes running multiple levels of the AIX operating system and PSSP support software, as illustrated in levels data file 201, a command "splst_versions" is provided to analyze the software level information about one or more nodes in the system partition as recorded in the SDR files of 114, and report that information to the requester. The definition of the "splst_versions" command is as follows:

--- splst_versions

| | | |
|---|---|---|
| Purpose | splst_versions—Returns information about the PSSP code version installed on nodes in the SP system. | |
| Syntax | splst_versions [-G] [-l] [-e] [-n node_num] [-N node_group] [-t] [-h] | |
| Flags | -G | Causes the command to look at all system partitions rather than just the current system partition (but not the control workstation). |
| | -l | Returns the latest PSSP version for the nodes that are the target of the command. |
| | -e | Returns the earliest PSSP version for the nodes that are the target of the command. |
| | -n node_num | Returns the PSSP code version for node_num. Use node_num 0 to specify the control workstation. |
| | -N node_group | Returns a list of PSSP versions for node_group. If -G is supplied, a global node group is used. Otherwise, a partitioned-bound node group is used. |
| | -t | Returns the node number and PSSP version in two columns. |
| | -h | Displays usage information. |

---

DESCRIPTION

Use this command to return a list of PSSP code versions that are installed on the nodes in the current system partition. The PSSP version and release numbers are included in the output. The modification level and fix level are not returned as part of the output. Node number 0 (zero) is considered the control workstation and is not evaluated as part of any system partition. The output is sorted in ascending order by version.

If the −t flag is omitted, there will be only one record for each version present. If the −t flag is used, there will be a record for each node.

EXAMPLES

1. To list each PSSP version represented in the current system partition, enter:

prompt>splst_versions
PSSP-1.2
PSSP-2.2

2. To list each node in the system partition and its PSSP code version, enter:

prompt>splst_versions −t
1 PSSP-2.1
5 PSSP-2.1
6 PSSP-2.1
9 PSSP-2.2

3. To list the earliest and latest PSSP code versions in a system partition, enter:

```
prompt> splst_versions -l -e
PSSP-2.1              /* this case has mixed
                         partitions */
PSSP-2.2
```

The following will be the output if only PSSP-2.2 exists in the system partition:

```
prompt> splst_versions -l -e
PSSP-2.2              /* this case has only 2.2
                         in partition */
```

It will be understood that the splst_versions command allows the ability to display the application software level for a particular node, the earliest application software level for a group of nodes or a system partition, or the latest application software level for a group of nodes or a system partition. This is important as it allows the function to determine what's running (and hence, what will "work") on a particular node. It also allows the function to determine what degree of compatibility exits between groups of nodes, particularly the group of nodes which comprise a system partition.

Figure 3:
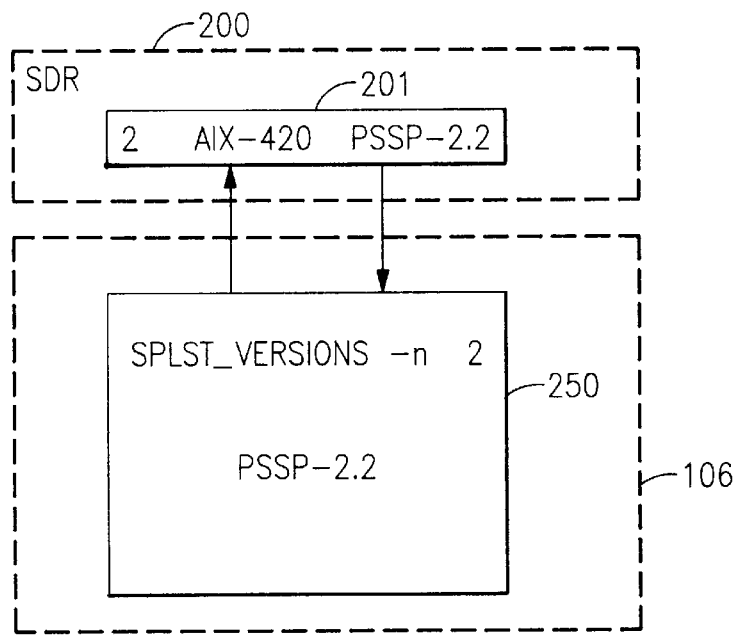
FIG. 3 is a block diagram showing the operation of the splst_versions command of the present invention.

FIG. 3 is a block diagram illustrating the use of the splst_versions command. The splst_versions command, in the embodiment of FIG. 3, is issued by a node 106 with the flag −n and node number 2. The command splst_versions causes the entry for node 2 in the levels data file 201 in the SDR 200 to be read, and the level of the support program (PSSP-2.2 in the present example) to be displayed at 250 for the requester.

Returning to FIG. 2, support subsystems running within the system partition 202 typically require running subsystems daemons on each node 106 in the partition 202 to provide services to/from that node to/from the other nodes in the system partition 202. The software level of the subsystem daemon is usually dictated by a combination of the level of operating system and support software running on the node. On the control node 112, a subsystem daemon for the level or levels of the subsystem (for instance, many subsystems are downward compatible with older levels) must be run in order to communicate with the different levels of subsystem daemons running throughout the system partitions.

The new command called the "Syspar Controller" (syspar_ctrl) provides the interface to manage the starting, stopping, refreshing, etc. of subsystem daemons throughout the nodes, including the control workstation 112. A file "syspar_subsystems" shown at 204 is included on the DASD device 114 for use by the control workstation 112, and on each DASD device 107 for use by its associated node 106. The syspar_subsystems file is read by the Syspar Controller command being executed by the workstation or associated node, as will be explained. The "syspar_subsystems" file 204 contains the list of subsystem names under control of the Syspar Controller command program along with the pathname to an associated control script 206 for each subsystem on that node 106 or the control workstation 112, as the case may be. In the case of the control workstation 112, the control script file 206 is stored on the DASD device 114. For each of the other nodes 106, the control script file 206 is stored on its associated DASD device 107. There is a different syspar_subsystems file 204 for each level of PSSP support software. The appropriate syspar_subsystems file 204 and control scripts file 206 will be installed on the control workstation 112 during installation of the control workstation operating system and PSSP support software for the CWS. Likewise, the appropriate syspar_subsystem file 204 and control script file 206 will be installed on the node 106 during installation or migration on that node. It will be understood that migration means migrating from one version or level of the operating system or PSSP support software to another version or level.

An example of the syspar_subsystems file 204 is shown in Table 2.

TABLE 2

| | |
|---|---|
| hats | /usr/lpp/ssp/bin/hatsctrl |
| hb | /usr/lpp/ssp/bin/hbctrl |
| hags | /usr/lpp/ssp/bin/hagsctrl |
| haem | /usr/lpp/ssp/bin/haemctrl |
| hr | /usr/lpp/ssp/bin/hrctrl |
| pman | /usr/lpp/ssp/bin/pmanctrl |
| emon | /usr/lpp/ssp/bin/emonctrl |
| sp_configd | /usr/lpp/ssp/bin/sp_configdctrl |
| emcond | /usr/lpp/ssp/bin/emconditionctrl |
| spdmd | /usr/lpp/ptpe/bin/spdmdctrl |

The Syspar Controller command is invoked with a function code (option flag) by the administrator or by an administrative function of the support software PSSP as necessary. The Syspar Controller command invokes the control script 206 for each subsystem under its control (as found in the syspar_subsystems file 204) passing the function code along for interpretation by each subsystems' control script 206. The control script 206 for each subsystem is responsible for performing whatever processing is required to implement that function in the subsystem throughout the system. In this way, the administrator is relieved of the responsibility of managing the potentially many and different levels of subsystem daemons with their varying options throughout the collection of nodes which comprise the system partition 202.

The Syspar Controller command completes its tasks by invoking an appropriate control script for each target subsystem listed in the syspar_subsystems file. Each control script is a program which is specific to the subsystem it controls. Typically, a subsystem controls one daemon, but it may control more than one. The control script has intimate knowledge of the interface requirements of its subsystem daemon—how to start it, stop it, refresh it, etc. Every control script (regardless of subsystem) is invoked by the Syspar Controller command with the same function code to accomplish the same task (e.g., −s for start, −k for stop, −r for refresh, etc.). The control script turns the generic function code into the specific command invocation required to perform that function on the level of subsystem daemon running on the node or control node. This mechanism relieves the administrator from issuing individual (and potentially different) commands throughout nodes in a system partition 202 when a function is required to be performed on them. The administrator need only ensure that the correct level information has been recorded in the central repository file 201.

The Syspar Controller (syspar_ctrl) command is defined as follows:

| | | |
|---|---|---|
| syspar_ctrl | | |
| Purpose | syspar_ctrl - Starts, stops, adds, deletes, and refreshes the system partition-sensitive subsystems installed on the SP system. | |
| Syntax | syspar_ctrl [-G] [-V] {-a \| -d \| -s \| -k \| -t \| -o \| -c \| -r \| -h \| -A \| -D \| -E \| -R} [subsystem_name] | |
| Flags | -h | (help) Displays usage information. If a subsystem name is specified, help is provided only for the specified subsystem's control script. Help is displayed as a syntax description and is written to standard output. Once help is displayed, no other action is taken even if other valid options are entered with the -h flag. |
| | -a | (add) Adds all subsystems. If a subsystem name is specified, only the specified subsystem is added. Each subsystem's control script 206 is invoked with the -a flag. Typically, this causes each subsystem's control script 206 to add itself to the System Resource Controller (SRC) subsystem, /etc/inittab and /etc/services. The SRC is described in the publication AIXVersion4.1 SystemManagementGuide:OperatingSystem andDevices, SC23-2544, available from IBM. The actual function that is performed depends on whether the underlying control script runs on the control workstation or on a node. |
| | -A | (add and start) Adds and starts all subsystems. If a subsystem_name is specified, only the specified subsystem is added and started. Each subsystem's control script 206 is invoked with the -a flag followed by the -s flag. This is a convenience option that provides the same function as first calling syspar_ctrl with the -a flag followed by the -s flag. |
| | -c | (clean) Cleans up after all of the subsystems. If a subsystem_name is specified, only the specified subsystem is cleaned up. Each subsystem's control script 206 is invoked with the -c flag. Typically, this causes each subsystem's control script 206 to stop any subsystem daemons that may be running and clean or remove all entries for this subsystem from the SRC, /etc/inittab, /etc/services. This flag is similar to the -d (delete) flag, but independent of system partitions. Cleaning up the subsystems is done in the reverse order of how the subsystems are listed in the Syspar Controller subsystems file. This option is used to clean up subsystem information while |

-continued

| | |
|---|---|
| | trying to get back to some preexisting state, such as when an old System Data Repository (SDR) is restored and the old system partitioning needs to be restored. |
| -d | (delete) Deletes all subsystems. If a subsystem_name is specified, the specified subsystem is deleted. Each subsystem's control script 206 is invoked with the -d flag. Typically, this causes each subsystem's control script 206 to delete itself from the SRC subsystem, /etc/inittab and /etc/services. Deleting subsystems is done in the reverse order of how the subsystems are listed in the Syspar Controller subsystems file. The actual function that is performed depends on whether the underlying control script runs on the control workstation 112 or on a node 106. |
| -D | (stop and delete) Stops and deletes all subsystems. If a subsystem_name is specified, that subsystem is stopped and deleted. Each subsystem's control script 206 is invoked with the -k flag followed by the -d flag. This is a convenience option that provides the same function as first calling syspar_ctrl with the -k flag followed by the -d flag. |
| -E | (examine) Examines all subsystems. If a subsystem_name is specified, the specified subsystem is examined in the Syspar Controller subsystems file. Each subsystem name - control script (204-206) pair in the subsystems file is examined and displayed. Entries that are not valid are noted. An entry is not valid when the control script 206 for a particular subsystem 204 does not exist at the specified location or does not have the correct read and execute permissions. |
| -G | (global) Invokes the appropriate underlying subsystem's control scripts 206 for each system partition 202. If the -G flag is not specified, the appropriate underlying subsystem's control script 206 is run only in the current system partition (SP_NAME). |
| -k | (kill or stop) Stops all subsystems. If a subsystem_name is specified, only the specified subsystem is stopped. Each subsystem's control script 206 is invoked with the -k flag. Typically, this causes each subsystem's control script 206 to stop any daemons associated with this particular subsystem. Stopping subsystems is done in the reverse order of how the subsystems are listed in the Syspar Controller's subsystem file. The actual function that is performed depends on whether the underlying control script 206 runs on the control workstation 112 or on a node 106. |
| -r | (refresh) Refreshes all subsystems. If a subsystem_name is provided, only the specified subsystem is refreshed. Each subsystem's control script 206 is invoked with the -r flag. Typically, this causes each subsystem's control script 206 to rebuild configuration data and refresh any daemons associated with this particular subsystem. Subsystems may need to be refreshed when nodes are added to an existing system or the nodes PSSP version changes. The actual function that is performed depends on the subsystem. This option is only meaningful when run on the control workstation 112. |
| -R | (restore) Restores all subsystems. If a subsystem_name is specified, only the specified subsystem is restored. All subsystems are stopped and deleted before they are added and started. Each subsystem's control script 206 is invoked with the -k |

-continued

| | |
|---|---|
| | flag followed by the -d flag, then the -a flag followed by the -s flag. This is a convenience option that provides the same function as first calling syspar_ctrl with the -D flag followed by the -A flag. |
| -s | (start) Starts all subsystems. If a subsystem name is specified, only the specified subsystem is started. Each subsystem's control script 206 is invoked with the -s flag. Typically, this causes each subsystem's control script 206 to start any daemons associated with this particular subsystem. The actual function that is performed depends on whether the underlying control script runs on the control workstation 112 or on a node 106. |
| -t | (trace on) Turns the trace option on for all subsystems. If a subsystem_name is specified, the trace option is turned on only for the specified subsystem. Each subsystem's control script 206 is invoked with the -t flag. Note: It is recommended to only turn on a particular subsystem's trace by providing a subsystem name. If the trace is turned on for all subsystems, the volume of data produced may quickly fill up /var. |
| -o | (trace off) Turns the trace option off for all subsystems. If a subsystem_name is specified, the trace option is turned off only for the specified subsystem. Each subsystem's control script 206 is invoked with the -o flag. |
| -v | (verbose) Turns verbose mode on in the syspar_ctrl script which then prints out the actual calls it makes to the underlying subsystem control scripts 206. It also prints out additional information that is useful for debugging. |
| Operands | |
| subsystem_name | Specifies the subsystem name that you want the command to act on. If a subsystem_name is not provided, this command is run for all subsystems that are listed in the Syspar Controller subsystems file (syspar_subsystems 204). For example, to only run this command on the Event Management subsystem, enter: syspar_ctrl option haem |

DESCRIPTION

This command acts as an interface to the system partition–sensitive subsystems supporting the functions that are shared by all subsystems. This command is also referred to as the Syspar Controller. It can be used to add or delete, start or stop, refresh or restore the subsystems, and various other functions. When used on the control workstation 112, it works with the subsystems on the control workstation 112. When used on the nodes 106, it works with the subsystems on the nodes 106. The refresh option is an exception. In order to refresh some subsystems, the subsystem must be refreshed on both the control workstation and on the nodes. In this case, the refresh on the control workstation will execute an appropriate refresh command from the control workstation to the appropriate nodes, typically via the "dsh" command, as explained in the aforementioned GC23-3900-01 manual.

This command supports two types of options: primitive options and macro options. Primitive options are passed directly to the underlying control scripts, for example, -a (add), -d (delete), -r (refresh). Macro options conveniently group a commonly used set of primitive options into one option, for example, -R (restore). All of the subsystems and each subsystem's control script that are managed by the Syspar Controller are listed in the Syspar Controller subsystems file. By default, all of the control scripts 206 listed in the Syspar Controller subsystems file 204 will be called unless a subsystem_name is provided. In that case, the control script for just the specified subsystem will be called.

This command is automatically called when the system is partitioned (spapply_config) to first stop and delete the system partition-sensitive subsystems from system partitions that are being removed, and then to add and start the system partition-sensitive subsystems (for example, hats, hb, and hr) in new system partitions.

The Syspar Controller is also called when restoring the SDR with sprestore_config to first clean up and then add and start the system partition-sensitive subsystems (for example, hats, hb and hr) in each system partition 202.

The Syspar Controller also needs to be called with refresh flag (-r) by the System Administrator using the command line whenever a node is added or deleted from the system, or a node's PSSP support software level changes.

Files syspar_subsystems 204

Lists all of the system partition sensitive subsystems and their control scripts that are controlled by the Syspar Controller. Only the syspar_ctrl command should read this file.

This file is located in the directory /usr/lpp/ssp/config/cmi.

Security

Must be running with an effective user ID of root.

Environment Variables

| | |
|---|---|
| SP_NAME | syspar_ctrl sets the SP_NAME environment variable prior to calling the underlying subsystems. Typically, SP_NAME is set to the value returned from the spget_syspar -n command. However, when syspar_ctrl is called with the -G flag, syspar_ctrl sets SP_NAME in turn to each value returned by the splst_syspars -n command. The -c flag ignores system partition boundaries while all other options respect system partition boundaries. |

Exit Values

| | |
|---|---|
| 0 | Indicates the successful completion of the command. |
| 1 | Indicates that the command failed. Most likely a subsystem's control script returned a bad return code. |

Implementation Specifics

This command is part of the IBM Parallel System Support Programs (PSSP) Licensed Program Product (LPP).

Location

/usr/lpp/ssp/bin/syspar_ctrl

Related Information

Commands: emonctrl, hatsctrl, hbctrl, hrctrl, haemctrl, hagsctrl, pmanctrl, sp_configdctrl, spapply_config, spcw_apps, sprestore_config

EXAMPLES

1. To add and start all of the system partitions subsystems in each of the system partitions, enter:

syspar_ctrl -G -A

2. To stop and delete all of the system partition subsystems in each of the system partitions, enter:

syspar_ctrl -G -D

3. To refresh all of the system partition subsystems in the current system partition, enter:

syspar_ctrl -r

4. To restore all of the system partition subsystems running in the current system partition, enter:

syspar ctrl -R

5. To stop all of the system partition subsystems running in the current system partition, enter:

syspar_ctrl -k

6. To get help for the event manager subsystem (haem) control script, enter:

syspar_ctrl -h haem

7. To display a list of all subsystems managed by the Syspar Controller, enter:

syspar_ctrl -E

8. To see the state of the system partition subsystems controlled by the Syspar Controller for system partition sppl, enter the commands:

lssrc -a | a grep sppl

Note: The SDR is not managed by the Syspar Controller.

Figure 4:
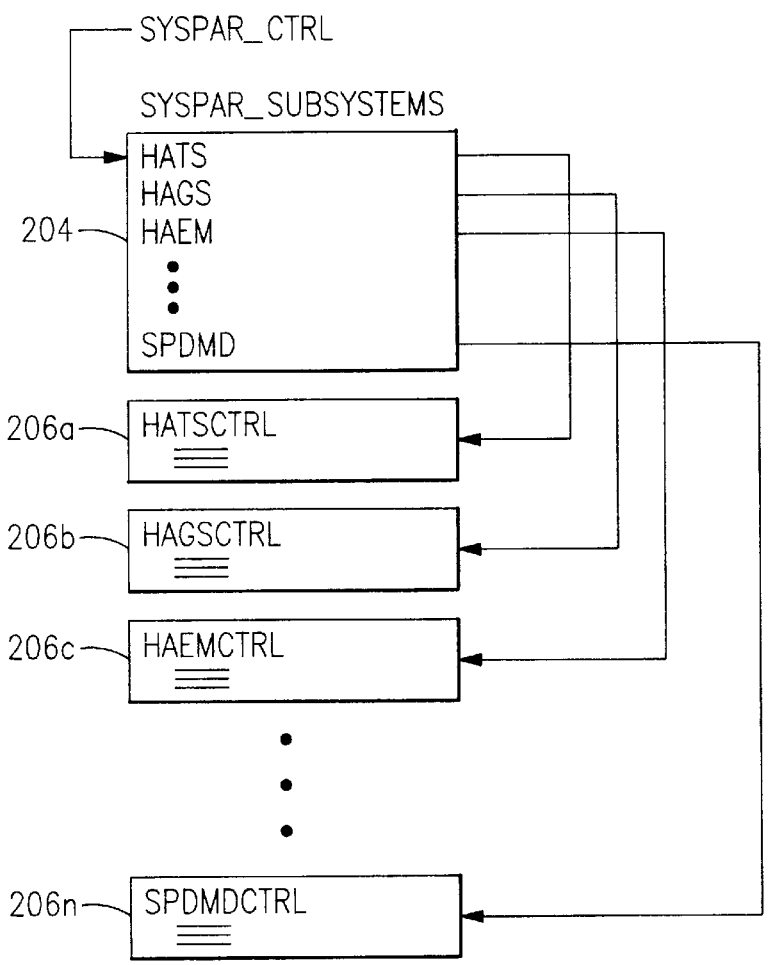
FIG. 4 is a block diagram illustrating the relationship between the syspar controller command, the syspar_subsystems file, and the control scripts.

FIG. 4 is a block diagram illustrating how the syspar_ctrl command locates the proper control script to perform the task designated by the flag included in the command. In FIG. 4, when the syspar_ctrl command is issued, either by the control workstation 112 or a node 106, the associated syspar-subsystems file 204 is accessed. Depending on the flag, one or more of the subsystems might be affected. The entry includes an address which points to the control script 206a–206n to be used with that subsystem. For instance, the flag -s starts all subsystems in the file 204, unless a specific subsystem is specified. In the example of FIG. 4, the control script for the hats subsystem shown in 204 is the hatsctrl control script 206a, the control script for hags is hagsctrl control script 206b, the control script for haem is haemctrl 206c, and the control script for spdmd is spdmdctrl 206n. It will be understood that, in this way, each syspar_ctrl command will be tailored by the control scripts to perform the requested function or task dependent on the PSSP level of the node which is executing the syspar_ctrl command.

Figure 5:
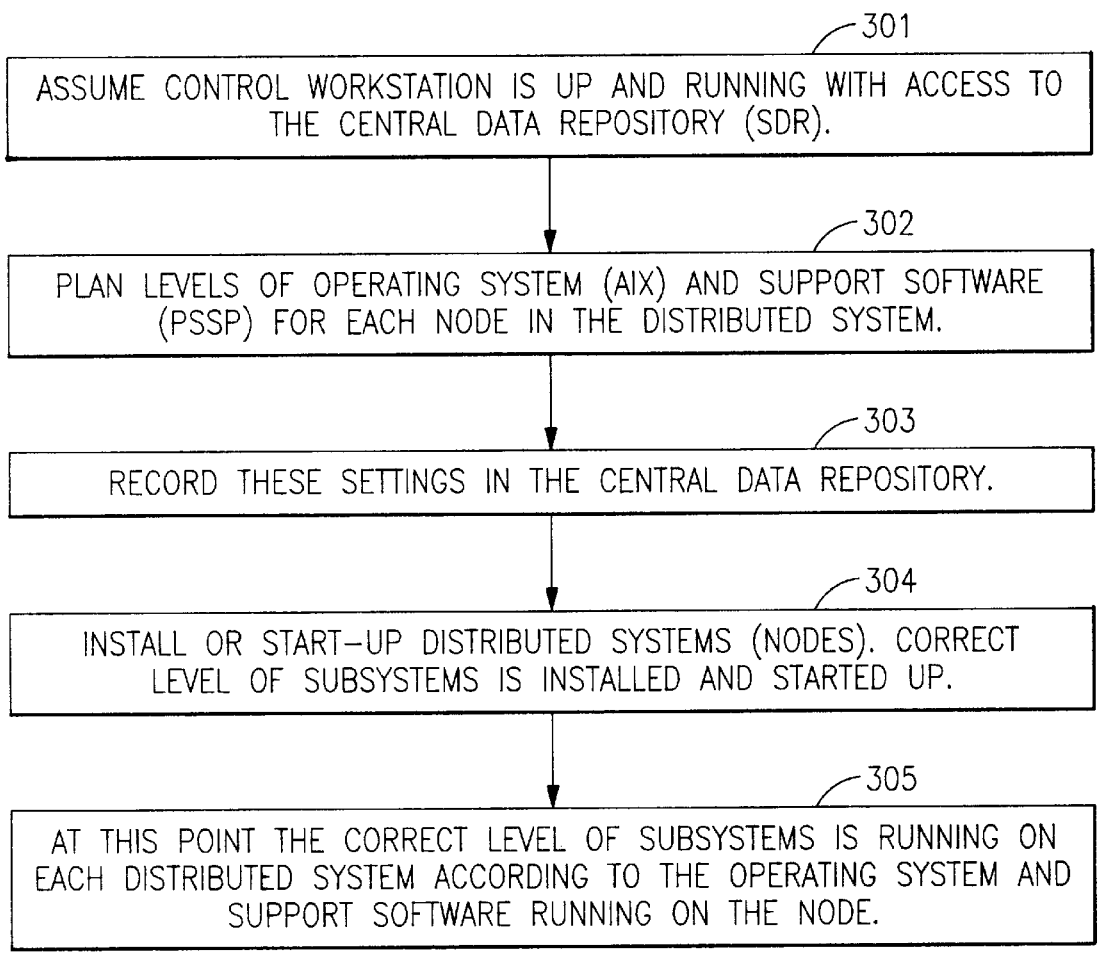
FIG. 5 is a flowchart showing a scenario wherein a new level of operating system and/or support software is introduced into the distributed system, or when the operating system and/or support software level is changed on one or more distributed systems.

FIG. 5 is a flowchart showing the scenario wherein a new level of operating system and/or support software is introduced into the distributed system, or when the operating system and/or support software level is changed on one or more distributed systems. As shown in FIG. 5, the correct level of subsystems must be started on both the distributed system(s) and the control workstation 112. At 301, the control workstation 112 is up and running with access to the central data repository on DASD 114. At 302, the administrator plans levels of the operating system (AIX) and support software (PSSP) for each node 106 in the distributed system 100. At 303, these setting are recorded in the file 201 in the central data repository on 114. At 304, the distributed systems on nodes 106 are installed or started-up. The installation on the nodes 106 in the partition 202 is disclosed in U.S. patent application Ser. No. 08/896,923 filed on Jul. 18, 1997by Russell et al. for MODULAR, PARALLEL, REMOTE SOFTWARE INSTALLATION WITH REPEATABLE, EXTERNALLY-INVOCABLE STEPS (Attorney Docket No. PO9-97-076) incorporated herein by reference, owned by the assignee of the present invention. In this installation, the correct level of subsystems is installed and started up. At 305, the correct levels of the subsystems are running on the distributed systems according to the operating system and support software running on the nodes, and as recorded in levels file 201.

FIG. 6 is a flowchart for scenario 1 for examining the subsystems managed by the Syspar Controller command described. In scenario 1, the administrator wishes to see what subsystems are managed by the Syspar Controller. In addition the administrator wishes to see the order in which the subsystems will be added and started or stopped and deleted. The steps in the flowchart of FIG. 6 are self explanatory, and will not be described further. A sample output when running syspar _ctrl_E on a PSSP 2.2 control workstation 112 is as follows:

>syspar_ctrl -E

Syspar controller managed subsystems and control scripts:

| | |
|---|---|
| hats | /usr/lpp/ssp/bin/hatsctrl |
| hb | /usr/lpp/ssp/bin/hbctrl |
| hags | /usr/lpp/ssp/bin/hagsctrl |
| haem | /usr/lpp/ssp/bin/haemctrl |
| hr | /usr/lpp/ssp/bin/hrctrl |
| pman | /usr/lpp/ssp/bin/pmanctrl |
| emon | /usr/lpp/ssp/bin/emonctrl |
| sp_configd | /usr/lpp/ssp/bin/sp_configdctrl |
| emcond | /usr/lpp/ssp/bin/emconditionctrl |
| spdmd | /usr/lpp/ptpe/bin/spdmdctrl |

It will be understood that this output is the same as the contents of the syspar_subsystems file 204 shown in Table 2.

One skilled in the art will understand the subsystems, control scripts, other commands referred to herein, as further explained in the aforementioned GC23-3900-01 manual, available from IBM.

Figure 7A:
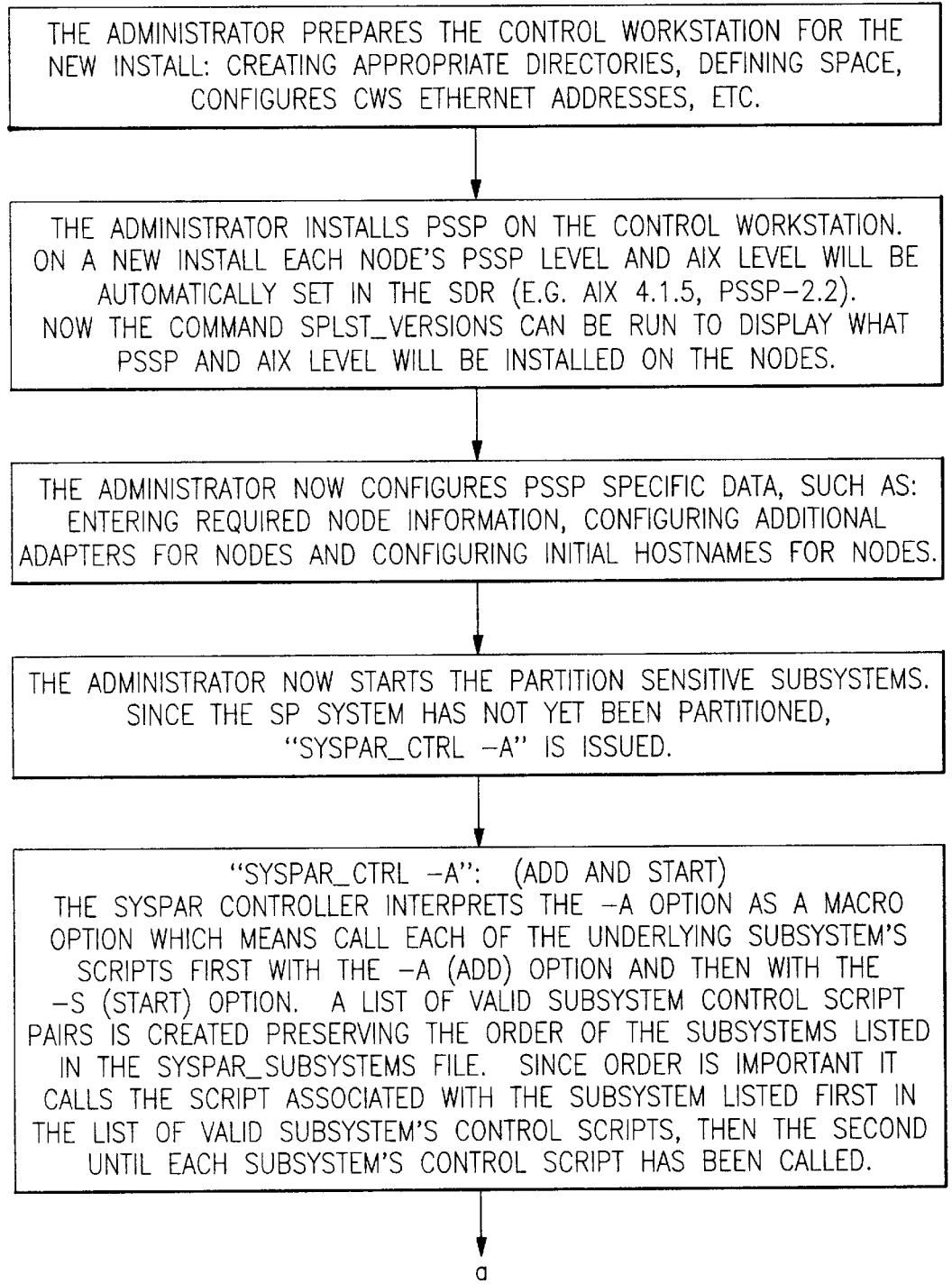
FIGS. 7a and 7b, when joined at a—a, form a flowchart for scenario 2a for performing a new install of an operating system and support software on the control workstation of the system of FIG. 1.
Figure 7B:
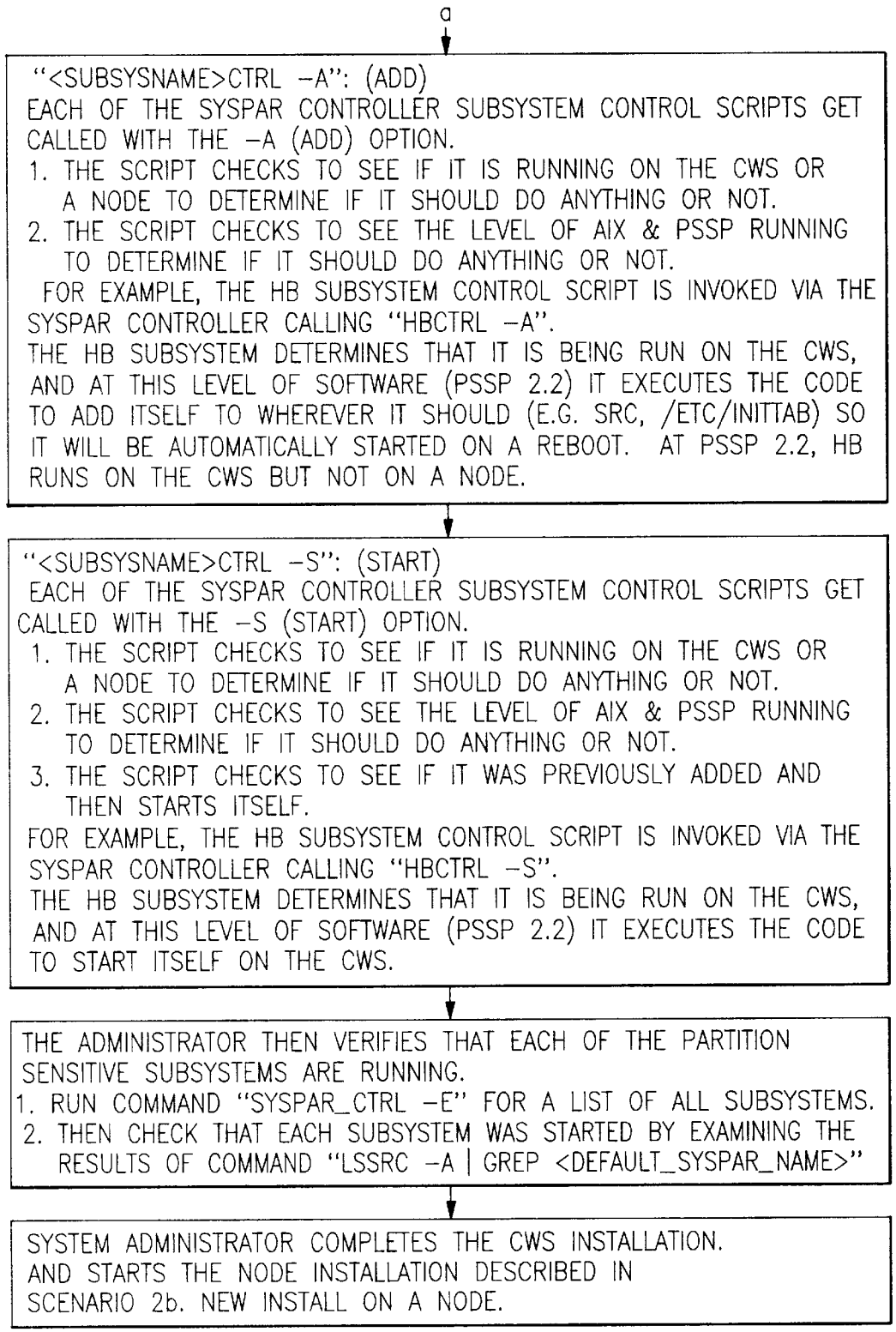

FIGS. 7a and 7b, when joined at a—a, form a flowchart for scenario 2a for performing a new install on the control workstation 112. The steps in FIGS. 7a and 7b are self explanatory, and will not be discussed further.

Figure 8B:
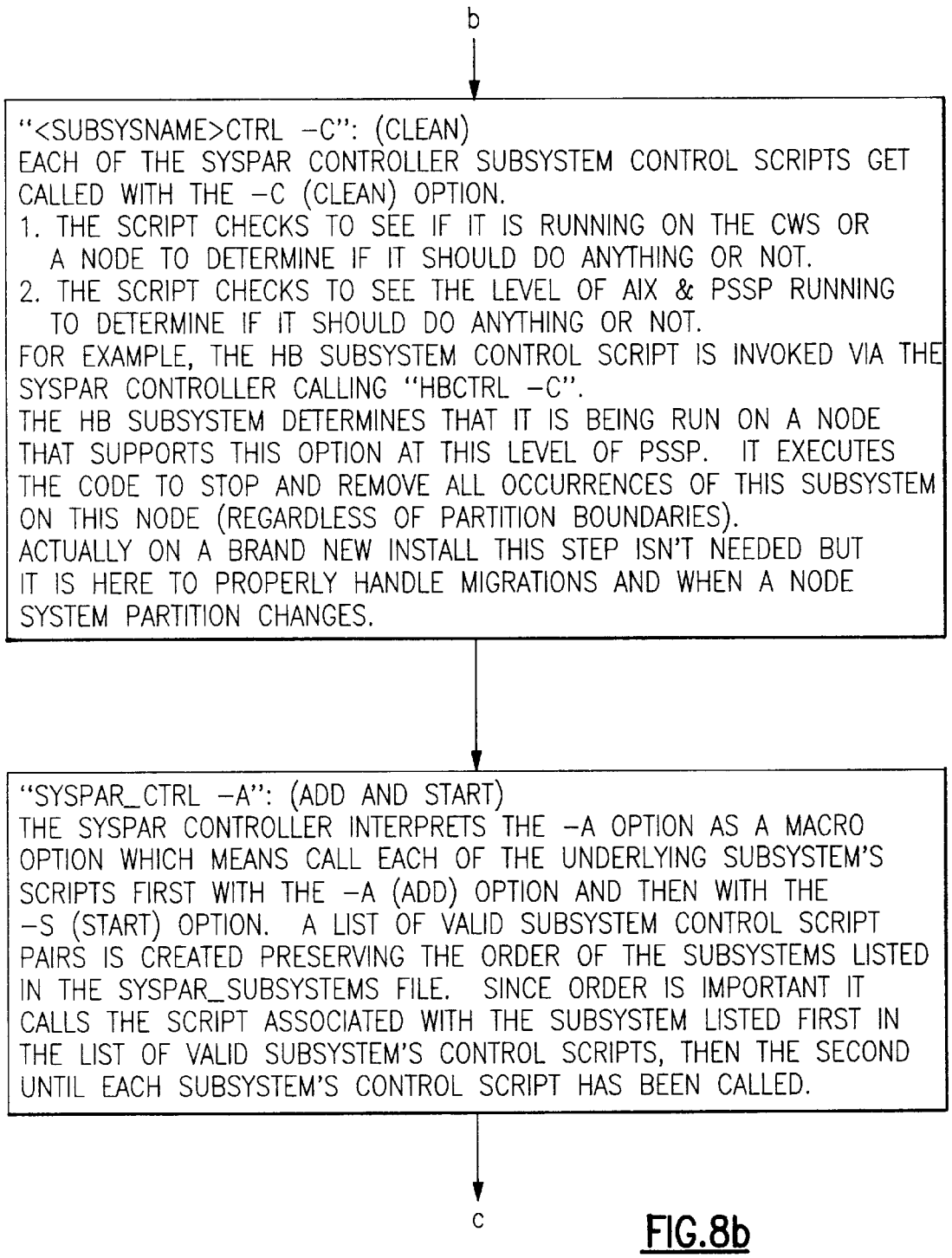
Figure 9B:
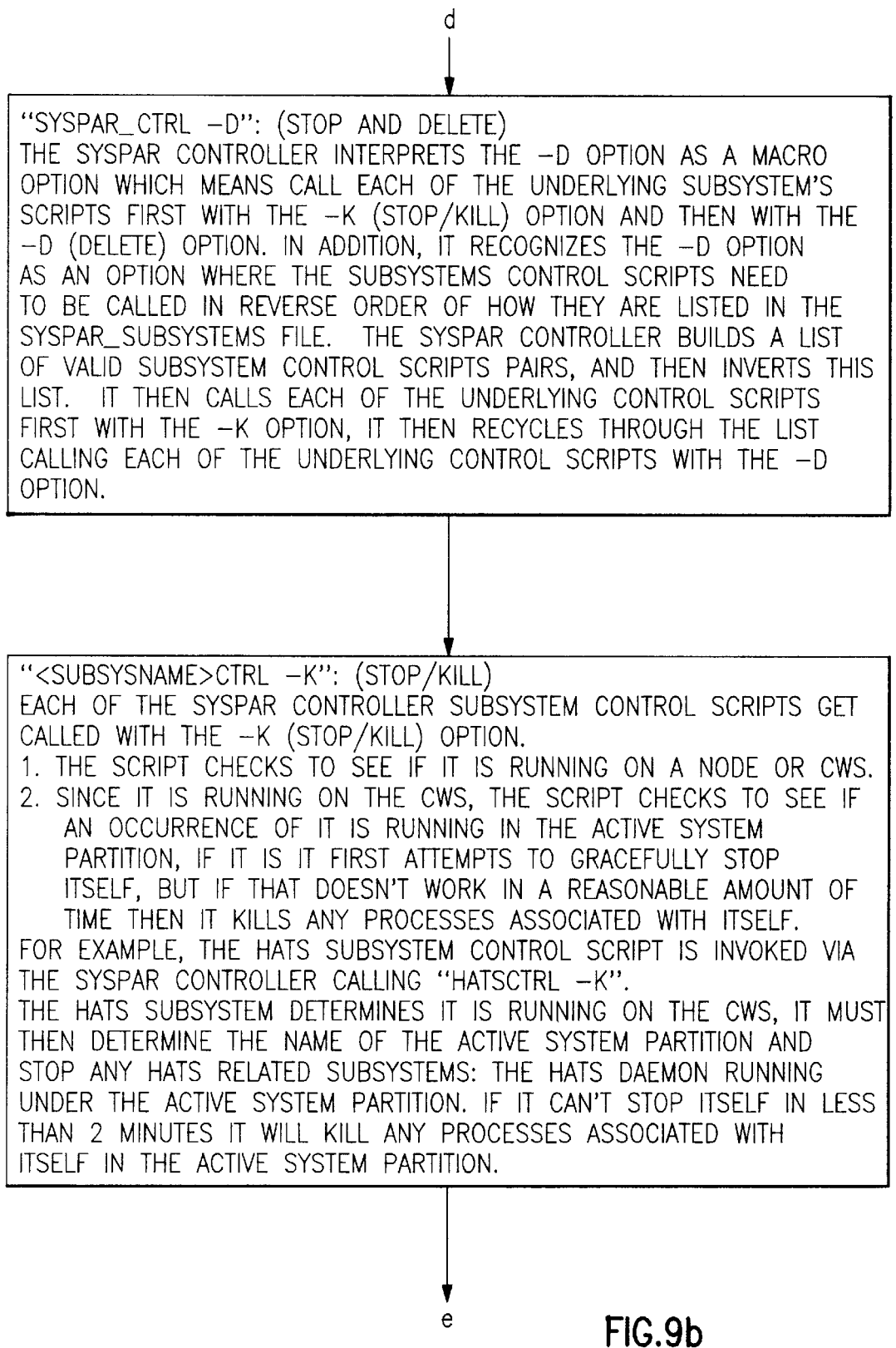
Figure 9D:
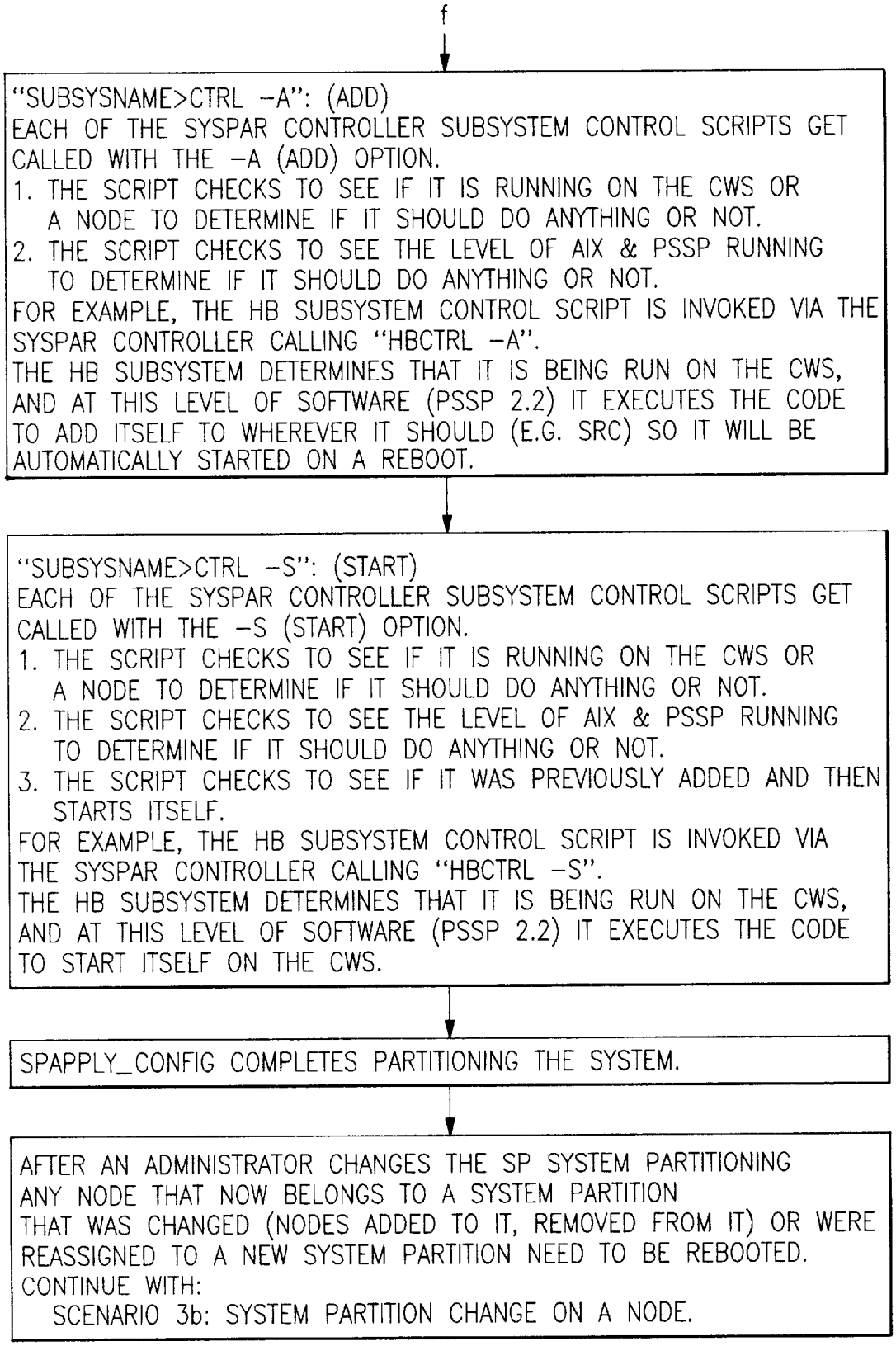

FIGS. 8a, 8b and 8c, when joined at b—b and c—c, form a flowchart for scenario 2b for performing a new install on a node 106. The steps in FIGS. 8a–8c are self explanatory, and will not be discussed further.

FIGS. 9a, 9b, 9c and 9d, when joined at d—d, e—e and f—f, form a flowchart for scenario 3a for performing a system partition change on the control workstation (CWS) 112. The steps in FIGS. 9a–9d are self explanatory, and will not be discussed further.

Figure 10C:
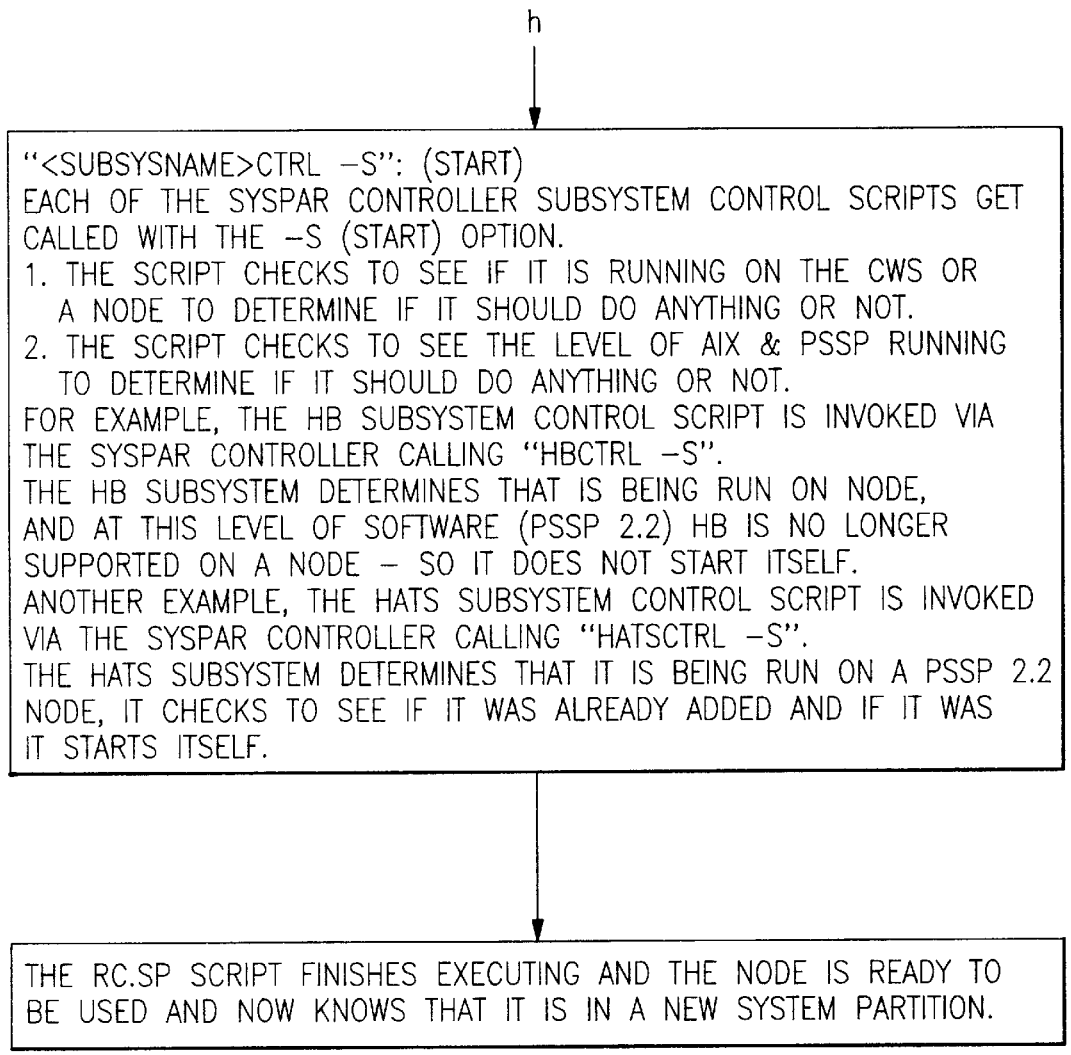

FIGS. 10a, 10b and 10c, when joined at g—g and h—h, form a flowchart for scenario 3b for performing a system partition change on a node 106. The steps in FIGS. 10a–10c are self explanatory, and will not be discussed further.

Figure 11B:
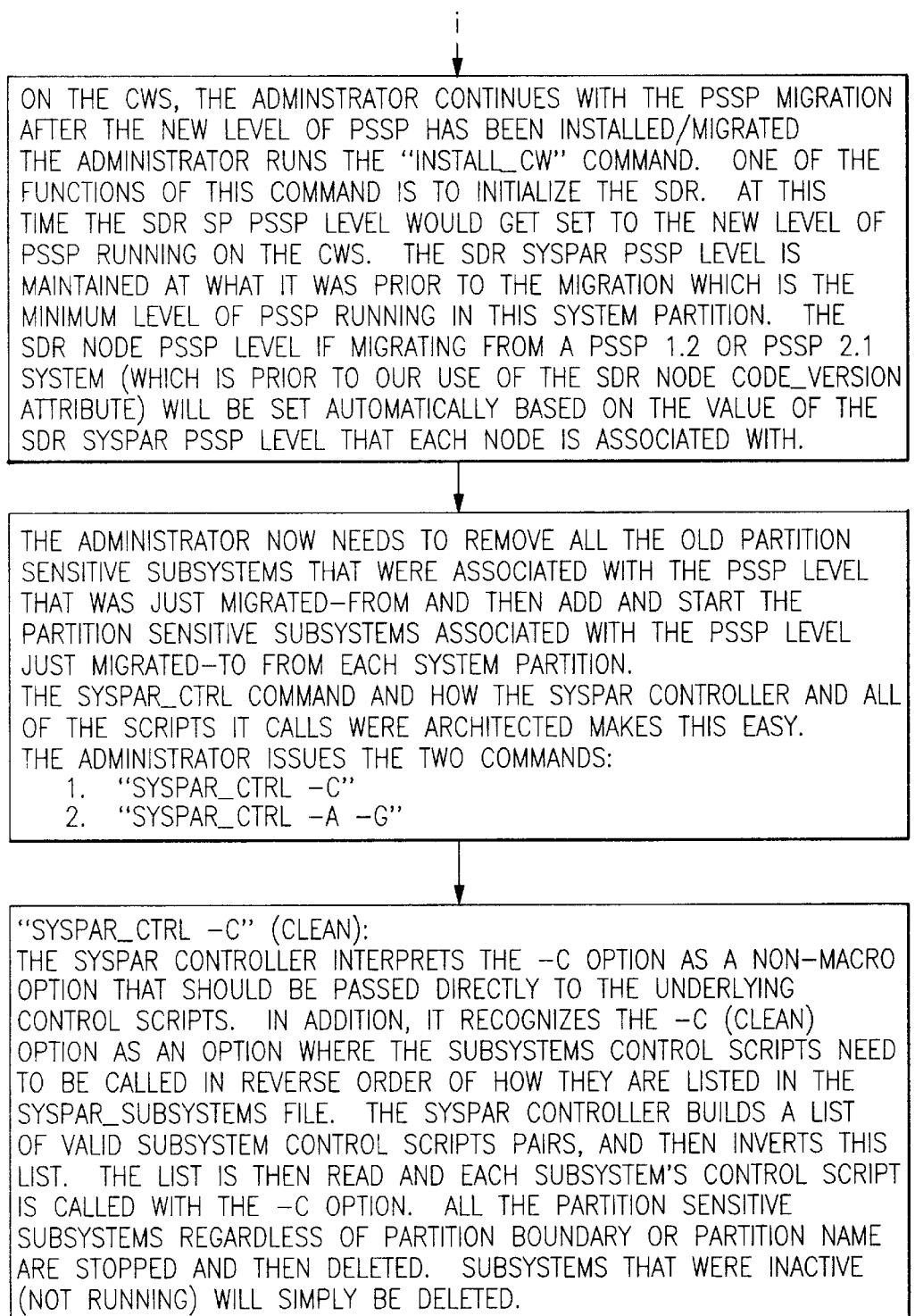
Figure 11C:
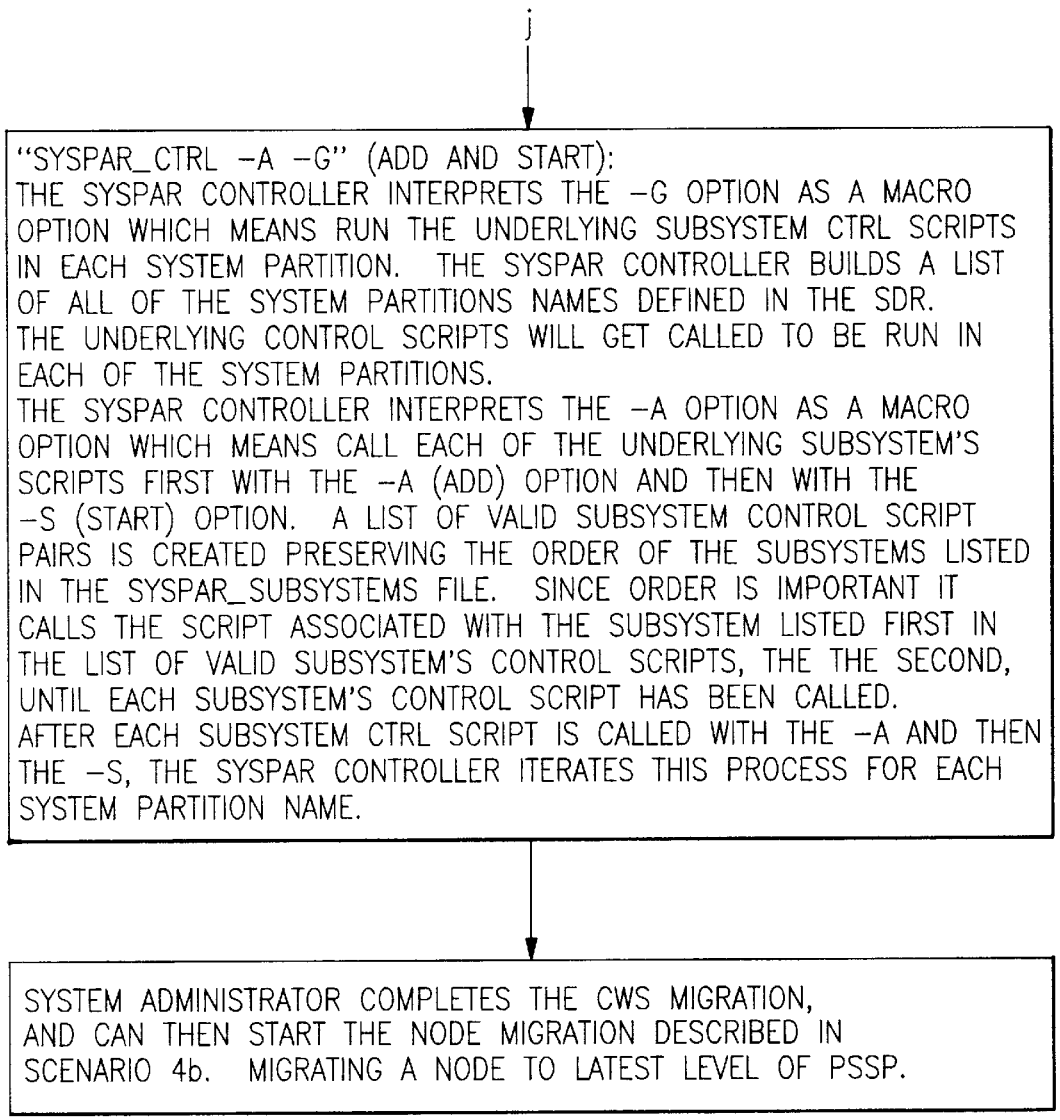
Figure 12C:
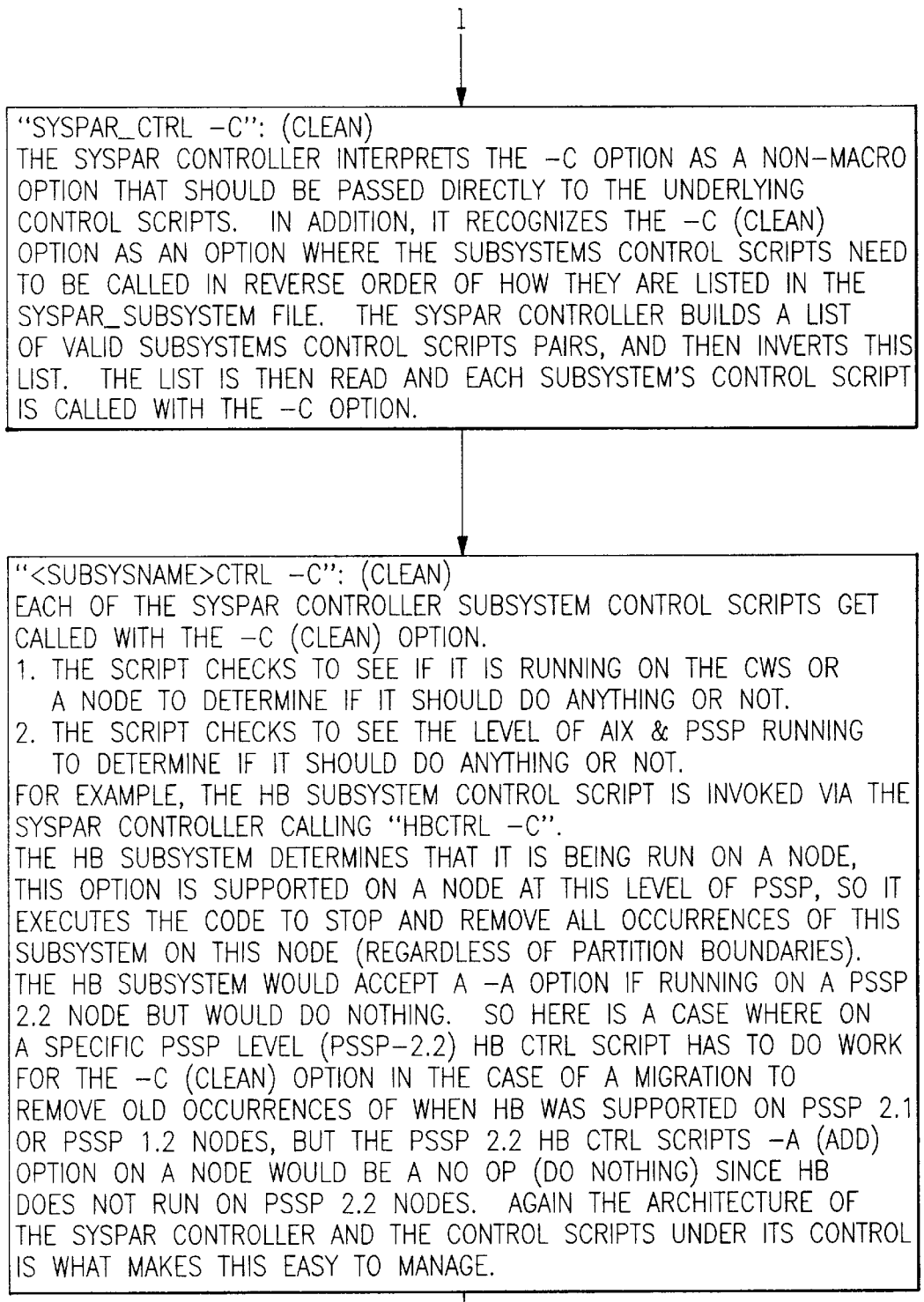
Figure 12D:
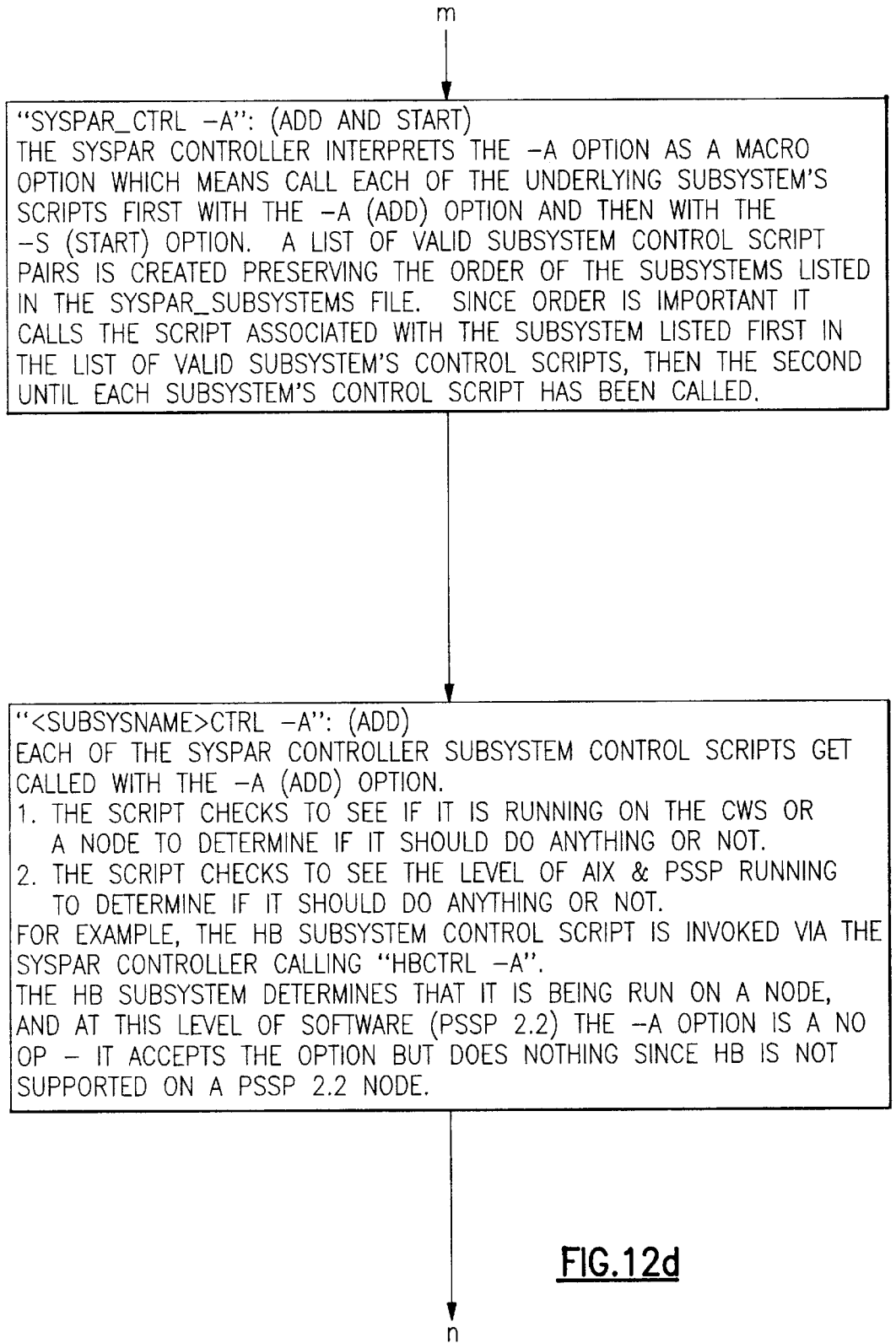
Figure 12E:
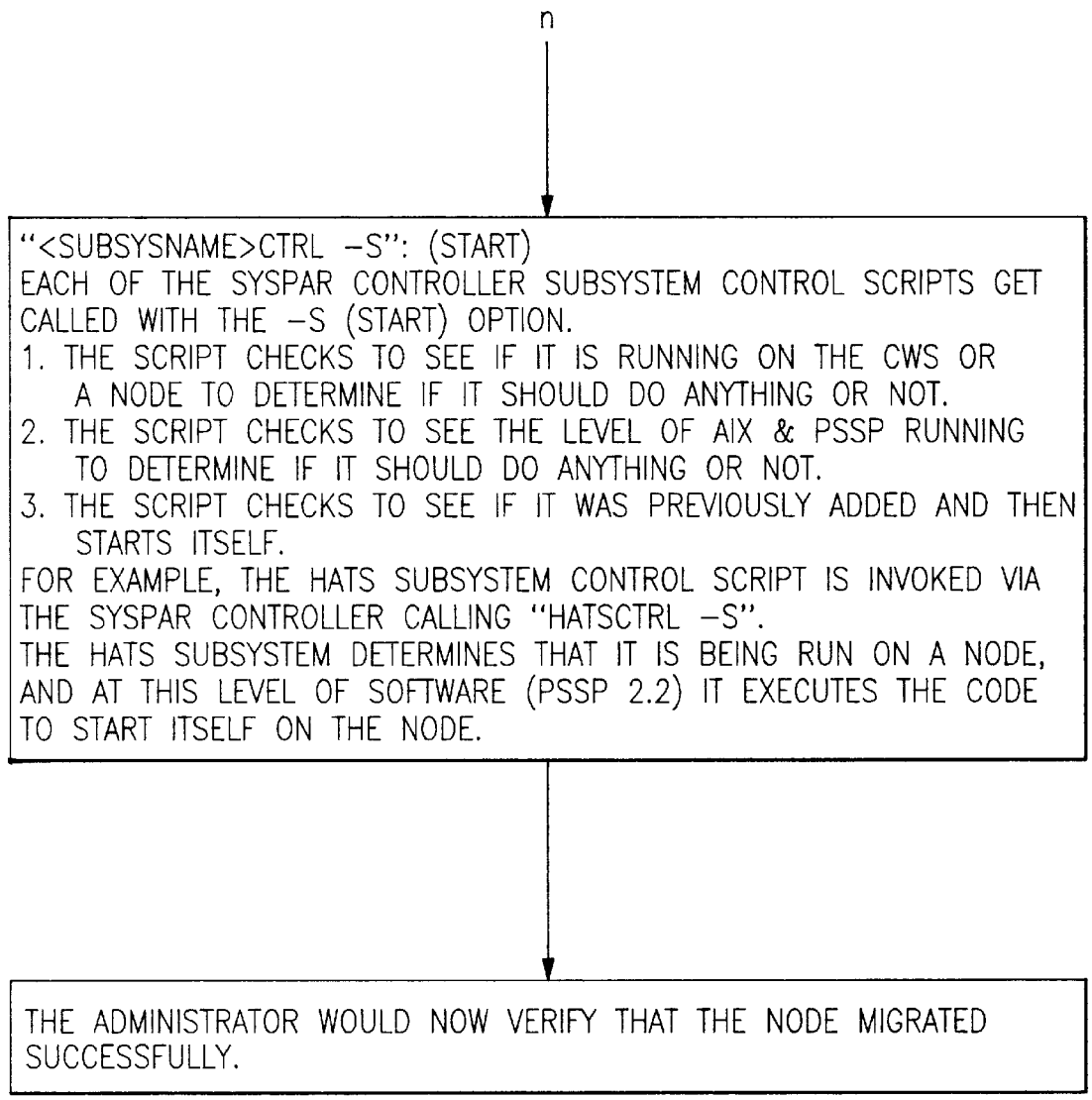

FIG. 11a, 11b and 11c, joined at i—i and j—j, form a flowchart for scenario 4a for migrating the control workstation 112 of the latest level of PSSP. The steps in FIGS. 11a and 11c are self explanatory, and will not be discussed further.

FIGS. 12a, 12b, 12c, 12d and 12e, joined at k—k, l—l, m—m and n—n, form a flowchart for scenario 4b for migrating a node 106 to the latest level of PSSP. The steps in FIGS. 12a–12e are self explanatory, and will not be discussed further.

Figure 13B:
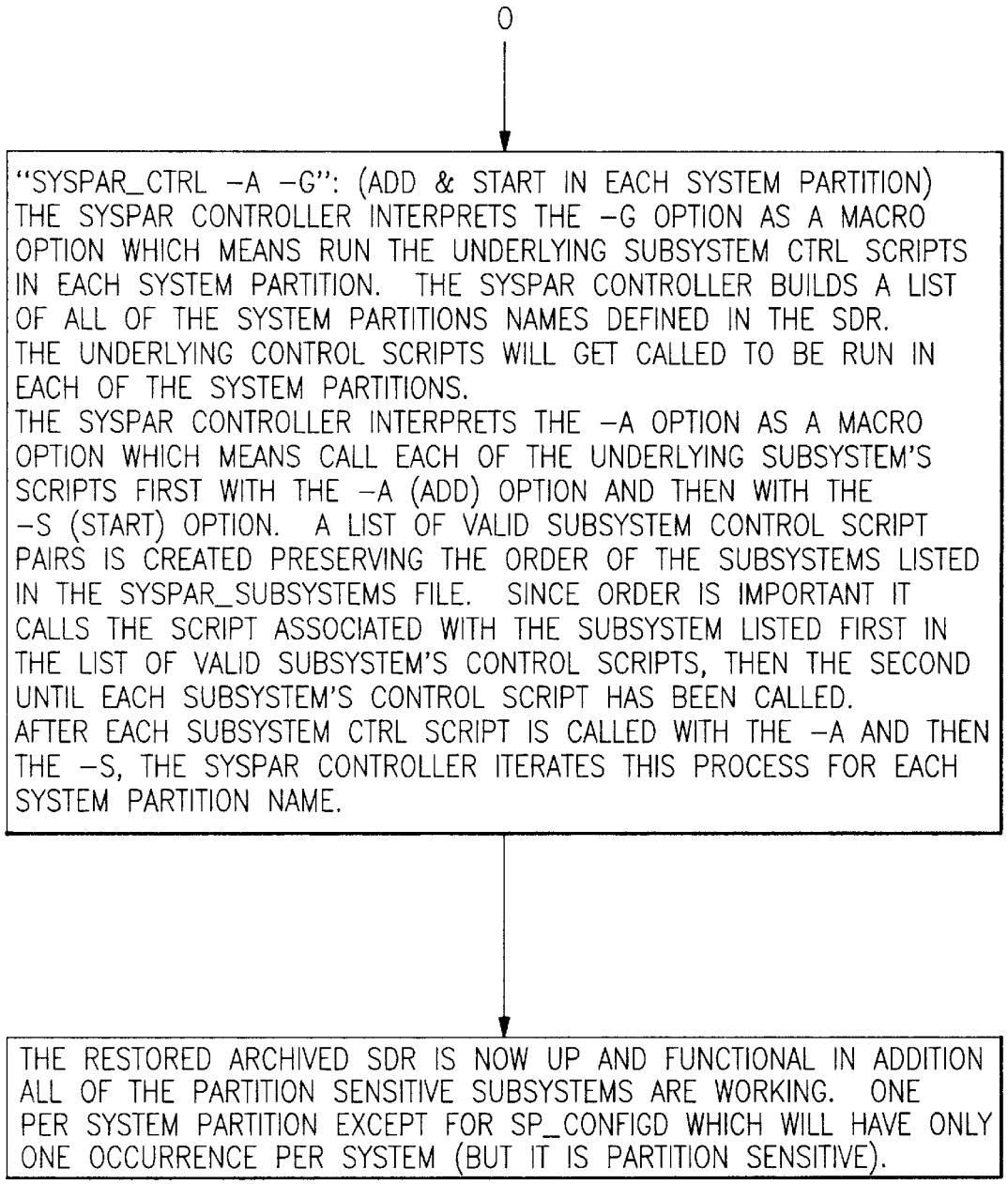

FIGS. 13a and 13b, joined at o—o, form a flowchart for scenario 5 for restoring a previously archived SDR and PSSP partitioning environment. The steps in FIGS. 13a–13b are self explanatory, and will not be discussed further.

It will be understood that the present Syspar Controller uses a common interface, and control scripts that also preserve this common interface so that the partition sensitive subsystems can be managed on a single control workstation, on multiple heterogenous nodes, and from a control workstation that actually distributes appropriate commands to the nodes. The disclosed Syspar Controller may perform functions on the node it is being run on. In the case of the control workstation, Syspar Controller may perform functions just on the control workstation, or it may actually start Syspar Controller functions on particular nodes or execute the underlying control scripts to be run on particular nodes. Which nodes the functions are performed on may depend on what level of PSSP is running on that node. What functions of the Syspar Controller (−c, −a, −k, etc.) are supported in the underlying control scripts on the control workstation or nodes is dependent on the PSSP version, AIX version, and whether the control script is running on a node or, possibly, the control workstation. Functions that aren't supported do not return an error message, and simply do nothing.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A computing system comprising:
a plurality of processors connected in a network of nodes;
a control workstation for managing application software to be run on said nodes;
means for sending a command from the control workstation to at least one node for execution by said the processor at said node, said command including a flag indicating the function to be performed by said command;
means for receiving said command at said one node;
means for locating a control script at said one node to perform the function indicated by said flag in said received command, said control script dependent on the level of the application software installed on said one node; and
means for executing the control script by the processor at said one node, thereby performing the function indicated by the flag included in the received command at said one node for the level of application software installed at said one node.

2. The computing system of claim 1 further comprising means for storing at said control workstation, a list of the levels of the application software installed at each of said nodes, and wherein said means for sending a command includes means for determining the flag to be included in said command dependent on the level of application software installed on the node to which the command is sent.

3. The computing system of claim 1 wherein said means for executing said control script performs a no operation for any function that is not supported by the application software installed at said one node.

4. A computing system comprising:
a plurality of processors connected in a network of nodes, each processor for executing a command thereon;
software installed on each node of said network;
a data storing device connected to at least one node of said network of nodes;
a first file stored in said data storing device for storing a list of software subsystems affected by the command to be executed; and
a second file for storing a control script for each of said software subsystems, said control script providing a routine to be followed during the execution of the command, said control scripts being compatible with the level of software installed at said one node.

5. The computing system of claim 4 further comprising a flag in said command to be executed by said one node, said flag specifying a task to be performed during the execution of said command.

6. The computing system of claim 5 wherein said control script includes a no operation when the task specified by said flag is not supported by the level of software installed at said one node.

7. A computing system comprising:
a plurality of processors connected in a network of nodes, each processor for executing a command thereon;
application software installed on each of said nodes, said application software installed on said nodes being at differing levels;
a common interface to the software levels in said network of nodes;
at least one control script at each node, said control script being compatible with the level of software on its associated node; and
said interface includes a task executable through said common interface at one of said nodes, said task being performed via the control script at said one node whereby said task is performed in a manner compatible with the level of software installed at said one node.

8. The computing system of claim 7 wherein said interface is a command having a flag which indicates the function to be performed by the command such that execution of said command to complete the function indicated by said flag is compatible with the level of software installed at said one node.

9. The computing system of claim 8 further comprising a data storage device connected to said one node storing a list of software subsystems affected by said command, each of said listed subsystems being linked to a control script wherein said function of said command at said one node includes selecting at least one of said software subsystems dependent on said flag, and executing the control script for the selected software subsystem.

10. The computing system of claim 9 wherein said control script of the selected software subsystem includes a no operation when the function indicated by said flag is not supported by the level of software installed at said one node.

11. A parallel distributed computing system comprising;
a plurality of processors connected in a network of nodes;
software installed at each node;
a control workstation controlling the nodes in said network, said control workstation for sending a controller command to be executed by at least one of said nodes in said network;
a data storage device connected to said control workstation;
a first file stored on said data storage device storing a list of the level of the software installed at each node;
a node data storage device connected to each node in said network storing at said one node;
a list of software subsystems stored in said one node data storage device, said list of software subsystems being those software subsystems affected by the controller command to be executed;
a control script for each of said software subsystems stored in the node data storage device of said one node, said control script providing a routine to be followed during the execution of the controller command, said control scripts being compatible with the level of software installed at said one node, whereby the execution of said controller command by said one node is performed in a manner which is compatible with the level of software installed at said one node.

12. The parallel distributed computing system of claim 11 further comprising a list command executed by said control workstation for displaying said list of the level of software installed at each node as stored at said control node.

13. The parallel distributed computing system of claim 12 wherein said list command comprises one of; displaying the software level for a particular node, displaying the earliest software level for a group of nodes, and displaying the latest software level for a group of nodes.

14. The parallel distributed computing system of claim 13 wherein nodes are arranged into at least one partition, and said displaying of said list command includes displaying the earliest and latest software levels of a group of nodes comprises displaying the earliest and latest software levels of a system partition.

15. The parallel distributed computing system of claim 11 further comprising a flag specifying a task to be performed during the execution of said controller command, said task selected to be compatible with the level of software installed at said one node as determined at said workstation from said list of levels stored on said data storage device.

16. The parallel distributed computing system of claim 15 further comprising:
   an update command for updating the level of the software stored in said list of software levels for said one node; and
   said control workstation includes a program for sending said controller command to the other nodes in the network with an appropriate flag notifying said other nodes that the level of said software of said one node is to be changed.

17. The parallel distributed computing system of claim 15 wherein said control script includes a no operation when the task specified by said flag is not supported by the level of software installed at said one node.

18. A parallel distributed computing system comprising:
   a plurality of processors connected in a network of nodes; each processor for executing a command;
   application software installed on each of said nodes, said application software installed on said nodes being at differing levels;
   a control workstation connected to said network for controlling said nodes;
   a common interface to the software levels in said network of nodes, said common interface for sending at least one task from said control workstation to selected ones of the nodes in said network;
   at least one control script at one of the nodes of said network, said control script being compatible with the level of software on its associated node wherein said task performed through said common interface at said one node via the control script at said one node is performed in a manner compatible with the level of software installed at said one node.

19. The parallel distributed computing system of claim 18 further comprising:
   a list at said control workstation listing the level of the software installed at each of the nodes in said network; and
   said interface includes a controller command having a flag which indicates the function to be performed by the controller command, said flag being selected to be compatible with the software installed at said one node as determined from said list such that the function of said flag at said one node to be performed in accordance with said control script at said one node is compatible with the level of software installed at said one node.

20. The parallel distributed computing system of claim 19 further comprising a list command for displaying said list of the level of software installed at each node as stored at said control node.

21. The parallel distributed computing system of claim 20 wherein said displaying of said list command comprises one of; displaying the software level for a particular node, displaying the earliest software level for a group of nodes, and displaying the latest software level for a group of nodes.

22. The parallel distributed computing system of claim 21 wherein said displaying of said list command which displays the earliest and latest software levels of a group of nodes further comprises displaying the earliest and latest software levels of a system partition.

23. The parallel distributed system of claim 22 further comprising:
   an update command updating the level of the software stored in said list of software levels for said one node; and
   a program in said control workstation sends a controller command to the other nodes in the network with an appropriate flag notifying said other nodes that the level said software of said one node is to be changed.

24. The parallel distributed computing system of claim 19 further comprising:
   a list of software subsystems affected by said controller command at said one node, each of said listed subsystems being linked to a control script, wherein at least one of said software subsystems is selected and its linked control script is executed dependent on said flag.

25. The parallel distributed computing system of claim 24 wherein said control script of the selected software subsystem includes a no operation when the function indicated by said flag is not supported by the level of software installed at said one node.

26. A computer product recorded on a computer readable medium for use in a computing system having a plurality of processors connected in a network of nodes and a control workstation for managing application software to be run on said nodes, the computer product performing a method of executing a command comprising the steps of:
   a) sending a command from the control workstation to at least one node for execution by said the processor at said node, said command including a flag indicating the function to be performed by said command;
   b) receiving said command at said one node;
   c) locating a control script at said one node to perform the function indicated by said flag in said received command, said control script dependent on the level of the application software installed on said one node; and
   d) executing the control script by the processor at said one node, thereby performing the function indicated by the flag included in the received command at said one node for the level of application software installed at said one node.

27. The computer program product of claim 26 wherein the method further comprises storing at said control workstation, a list of the levels of the application software installed at each of said nodes, and wherein step a) includes determining the flag to be included in said command dependent on the level of application software installed on the node to which the command is sent.

28. The program product of claim 26 wherein said control script performs a no operation for any function that is not supported by the application software installed at said one node.

29. A program product recorded on a computer readable medium for use in a computing system having a plurality of processors connected in a network of nodes, each node having software installed thereon, the program product performing a method of executing a command at one of the nodes comprising:
  storing at said one node, a list of software subsystems affected by the command to be executed;
  storing at said one node, a control script for each of said software subsystems, said control script providing a routine to be followed during the execution of the command, said control scripts being compatible with the level of software installed at said one node; and
  executing the command by said one node, said command comprising;
    locating in said list of software subsystems those software subsystems affected by said command,
    locating the control script for each subsystem affected by said command, and
    executing the located control script for each subsystem affected by said command, whereby the execution is performed in a manner which is compatible with the level of software installed at said one node.

30. The program product of claim 29 wherein said method further comprises the step of including in said command to be executed, a flag specifying a task to be performed during the execution of said command.

31. The program product of claim 30 wherein said control script performs a no operation when the task specified by said flag is not supported by the level of software installed at said one node.

32. A program product recorded on a computer readable medium for use in a computing system having a plurality of processors connected in a network of nodes and application software installed on each of said nodes, said application software installed on said nodes being at differing levels, the program product performing a method of executing a command at one or more nodes comprising:
  providing a common interface to the software levels in said network of nodes;
  providing at least one control script at each node, said control script being compatible with the level of software on its associated node; and
  performing a task through said common interface at one of said nodes, said task being performed via the control script at said one node whereby said task is performed in a manner compatible with the level of software installed at said one node.

33. The program product of claim 32 wherein said interface is a command having a flag which indicates the function to be performed by the command, said method performed by said program product further comprising:
  executing said command with a flag at said one node; and
  performing the function of said flag at said one node in accordance with said control script at said one node, whereby said execution of said command is compatible with the level of software installed at said one node.

34. The program product of claim 33 wherein a list of software subsystems affected by said command is recorded at said one node, each of said listed subsystems being linked to a control script, said method performed by said program product further comprising selecting at least one of said software subsystems dependent on said flag, and executing the control script for the selected software subsystem.

35. The program product of claim 34 wherein said control script of the selected software subsystem executes a no operation when the function indicated by said flag is not supported by the level of software installed at said one node.

36. A program product recorded on a computer readable medium for use in a parallel distributed computing system having a plurality of processors connected in a network of nodes, each node having software installed thereon, and a control workstation controlling the nodes in said network, the program product performing a method of executing a command at one of the nodes comprising:
  storing at said control workstation, a list of the level of the software installed at each node;
  sending to said one node, a command to be executed by said one node;
  storing at said one node, a list of software subsystems affected by the command to be executed;
  storing at said one node, a control script for each of said software subsystems, said control script providing a routine to be followed during the execution of the command, said control scripts being compatible with the level of software installed at said one node; and
  executing the command at said one node, said command comprising;
    locating in said list of software subsystems those software subsystems affected by said command,
    locating the control script for each subsystem affected by said command, and
    executing the located control script for each subsystem affected by said command, whereby the execution is performed in a manner which is compatible with the level of software installed at said one node.

37. The program product claim 36 wherein the method performed by the program product further comprises displaying said list of the level of software installed at each node as stored at said control node.

38. The program product of claim 37 wherein said displaying comprises one of; displaying the software level for a particular node, displaying the earliest software level for a group of nodes, and displaying the latest software level for a group of nodes.

39. The program product of claim 38 wherein said displaying the earliest and latest software levels of a group of nodes comprises displaying the earliest and latest software levels of a system partition.

40. The program product of claim 36 wherein the method performed by the program product further comprises the step of including in said command to be executed, a flag specifying a task to be performed during the execution of said command, said task selected to be compatible with the level of software installed at said one node as determined by said workstation from its list of levels.

41. The program product of claim 40 wherein the method performed by the program product further comprises:
  updating the level of the software stored in said list of software levels for said one node; and
  sending a command to the other nodes in the network with an appropriate flag notifying said other nodes that the level of said software of said one node is to be changed.

42. The program product of claim 40 wherein said control script performs a no operation when the task specified by said flag is not supported by the level of software installed at said one node.

43. A program product recorded on a computer readable medium for use in a parallel distributed computing system having a plurality of processors connected in a network of nodes, application software installed on each of said nodes, said application software installed on said nodes being at differing levels, and a control workstation connected to said network for controlling said nodes, the program product performing a method of executing a command at one or more nodes comprising:

providing a common interface to the software levels in said network of nodes;

providing at least one control script at each node, said control script being compatible with the level of software on its associated node and sending a task from the control workstation to said one node; and performing said task through said common interface at one of said nodes, said task being performed via the control script at said one node whereby said task is performed in a manner compatible with the level of software installed at said one node.

44. The program product of claim 43 wherein a list is stored at said control workstation listing the level of the software installed at each of the nodes in said network, and said interface is a command having a flag which indicates the function to be performed by the command, the method performed by the program product further comprising:

selecting said flag to be compatible with the software installed at said one node;

executing said command with said flag by said one node; and performing the function of said flag at said one node in accordance with said control script at said one node, whereby said execution of said command is compatible with the level of software installed at said one node.

45. The program product of claim 44 wherein the method performed by said program product further comprises displaying said list of the level of software installed at each node as stored at said control node.

46. The program product of claim 45 wherein said displaying comprises one of; displaying the software level for a particular node, displaying the earliest software level for a group of nodes, and displaying the latest software level for a group of nodes.

47. The program product of claim 46 wherein said displaying the earliest and latest software levels of a group of nodes comprises displaying the earliest and latest software levels of a system partition.

48. The program product of claim 47 wherein the method performed by the program product further comprises:

updating the level of the software stored in said list of software levels for said one node; and sending a command to the other nodes in the network with an appropriate flag notifying said other nodes that the level said software of said one node is to be changed.

49. The program product of claim 44 wherein a list of software subsystems affected by said command is recorded at said one node, each of said listed subsystems being linked to a control script, the method performed by the program product further comprising selecting at least one of said software subsystems dependent on said flag, and executing the control script for the selected software subsystem.

50. The program product of claim 49 wherein said control script of the selected software subsystem executes a no operation when the function indicated by said flag is not supported by the level of software installed at said one node.

* * * * *